(12) United States Patent
Ohtsuka et al.

(10) Patent No.: US 8,918,450 B2
(45) Date of Patent: Dec. 23, 2014

(54) SERVER APPARATUSES, SERVER CONTROL PROGRAMS, AND CLIENT APPARATUSES FOR A COMPUTER SYSTEM IN WHICH CREATED DRAWING DATA IS TRANSMITTED TO THE CLIENT APPARATUSES

(75) Inventors: Toshihiko Ohtsuka, Ome (JP);
Takayuki Hirotani, Akiruno (JP);
Shouzo Ohdate, Kodaira (JP)

(73) Assignee: Casio Computer Co., Ltd, Tokyo (JP)

( * ) Notice: Subject to any disclaimer, the term of this patent is extended or adjusted under 35 U.S.C. 154(b) by 628 days.

(21) Appl. No.: 11/674,514

(22) Filed: Feb. 13, 2007

(65) Prior Publication Data
US 2007/0192509 A1  Aug. 16, 2007

(30) Foreign Application Priority Data

Feb. 14, 2006  (JP) .................................. 2006-036652
Feb. 14, 2006  (JP) .................................. 2006-036653

(51) Int. Cl.
*G06F 15/16* (2006.01)
*H04N 1/32* (2006.01)
*H04N 1/42* (2006.01)

(52) U.S. Cl.
CPC ............. *H04N 1/42* (2013.01); *H04N 1/32117* (2013.01); *H04N 2201/3245* (2013.01)
USPC ........ 709/203; 709/217; 709/219; 348/207.1; 348/222.1; 348/239

(58) Field of Classification Search
CPC . G06F 3/0481; G06F 9/542; G09G 2320/103; G09G 2340/145; H04N 1/42
USPC ................. 709/201–203, 208, 212, 217, 219; 707/100–101; 715/200, 255, 272; 348/207.1, 222.1, 239
See application file for complete search history.

(56) References Cited

U.S. PATENT DOCUMENTS

| 4,833,535 A | 5/1989 | Ozeki et al. |
| 5,544,358 A | 8/1996 | Capps et al. |

(Continued)

FOREIGN PATENT DOCUMENTS

| EP | 0689342 | 12/1995 |
| EP | 1450277 | 8/2004 |

(Continued)

OTHER PUBLICATIONS

International Search Report for PCT/JP2007/052902 dated Jan. 25, 2008.

(Continued)

*Primary Examiner* — Mohamed Wasel
(74) *Attorney, Agent, or Firm* — Amin, Turocy & Watson, LLP

(57) ABSTRACT

The present drawing data stored in the present drawing data storage unit is compared with the preceding drawing data stored in the preceding drawing data storage unit for each of the drawing areas divided by the area dividing unit, thereby determining whether there is a change in the preceding drawing data for each of the drawing areas in the present drawing data. Then, control is performed to transmit to the client apparatus the drawing data in a drawing area determined to have a change by the comparison decision unit, except for a drawing area of the present drawing data determined to have no change by the comparison decision unit. Consequently, it is possible to remarkably reduce the amount of data transferred to the client apparatus as a result of a change in the drawing and therefore transfer the drawing data at high speed.

12 Claims, 21 Drawing Sheets

(56) References Cited

U.S. PATENT DOCUMENTS

| | | | |
|---|---|---|---|
| 5,634,052 A * | 5/1997 | Morris | 707/1 |
| 5,673,404 A | 9/1997 | Cousins et al. | |
| 5,818,616 A | 10/1998 | Kawai | |
| 5,848,415 A | 12/1998 | Guck | |
| 6,006,231 A | 12/1999 | Popa | |
| 6,016,478 A | 1/2000 | Zhang et al. | |
| 6,192,393 B1 | 2/2001 | Tarantino et al. | |
| 6,204,846 B1 | 3/2001 | Little et al. | |
| 6,343,313 B1 | 1/2002 | Salesky et al. | |
| 6,363,352 B1 | 3/2002 | Dailey et al. | |
| 6,434,599 B1 | 8/2002 | Porter | |
| 6,518,983 B1 | 2/2003 | Grohmann et al. | |
| 6,556,217 B1 | 4/2003 | Makipaa et al. | |
| 6,636,888 B1 | 10/2003 | Bookspan et al. | |
| 6,647,360 B2 | 11/2003 | Graham et al. | |
| 6,658,167 B1 * | 12/2003 | Lee et al. | 382/305 |
| 6,661,353 B1 | 12/2003 | Gopen | |
| 6,664,969 B1 * | 12/2003 | Emerson et al. | 345/544 |
| 6,704,024 B2 | 3/2004 | Robotham et al. | |
| 6,710,790 B1 | 3/2004 | Fagioli | |
| 6,725,268 B1 | 4/2004 | Jackel et al. | |
| 6,732,103 B1 | 5/2004 | Strick et al. | |
| 6,907,447 B1 | 6/2005 | Cooperman et al. | |
| 6,973,457 B1 | 12/2005 | Bastawala et al. | |
| 6,983,331 B1 | 1/2006 | Mitchell et al. | |
| 7,200,615 B2 | 4/2007 | Eschbach et al. | |
| 7,277,572 B2 | 10/2007 | MacInnes et al. | |
| 7,346,856 B2 | 3/2008 | Nguyen et al. | |
| 7,502,867 B2 | 3/2009 | Mitchell et al. | |
| 7,570,275 B2 | 8/2009 | Idesawa et al. | |
| 7,814,171 B2 | 10/2010 | Blegen et al. | |
| 7,844,915 B2 | 11/2010 | Platzer et al. | |
| 7,886,044 B2 | 2/2011 | Maki et al. | |
| 7,996,045 B1 | 8/2011 | Bauer et al. | |
| 8,072,435 B2 | 12/2011 | Hsieh et al. | |
| 2002/0080177 A1 | 6/2002 | Orbanes et al. | |
| 2002/0082811 A1 | 6/2002 | Honjas et al. | |
| 2003/0020758 A1 | 1/2003 | Hinderks | |
| 2003/0063043 A1 * | 4/2003 | Girard | 345/8 |
| 2004/0169668 A1 | 9/2004 | Yamada et al. | |
| 2004/0217980 A1 | 11/2004 | Radburn et al. | |
| 2005/0024364 A1 | 2/2005 | Shouen | |
| 2005/0058330 A1 | 3/2005 | Mitsuhashi et al. | |
| 2005/0086259 A1 | 4/2005 | Eschbach et al. | |
| 2005/0091596 A1 | 4/2005 | Anthony et al. | |
| 2005/0102631 A1 | 5/2005 | Andreas et al. | |
| 2005/0172221 A1 | 8/2005 | Kobashi et al. | |
| 2005/0187945 A1 | 8/2005 | Ehrich et al. | |
| 2005/0210399 A1 | 9/2005 | Filner et al. | |
| 2005/0259881 A1 * | 11/2005 | Goss | 382/243 |
| 2005/0281482 A1 | 12/2005 | Nishiyama | |
| 2005/0289631 A1 * | 12/2005 | Shoemake | 725/118 |
| 2006/0050973 A1 | 3/2006 | Ishikawa | |
| 2006/0110171 A1 * | 5/2006 | Miyazawa et al. | 399/8 |
| 2006/0123121 A1 * | 6/2006 | Maegawa et al. | 709/227 |
| 2006/0174026 A1 | 8/2006 | Robinson et al. | |
| 2006/0209094 A1 | 9/2006 | Usuda | |
| 2006/0221097 A1 | 10/2006 | Kagechi et al. | |
| 2007/0005690 A1 * | 1/2007 | Corley et al. | 709/203 |
| 2007/0130251 A1 | 6/2007 | Ohtsuka | |
| 2007/0143803 A1 | 6/2007 | Lim | |
| 2007/0150829 A1 | 6/2007 | Eschbach et al. | |
| 2007/0211066 A1 | 9/2007 | Kanda | |
| 2007/0234229 A1 | 10/2007 | Ohtsuka et al. | |
| 2007/0245021 A1 | 10/2007 | Ohtsuka et al. | |
| 2007/0297596 A1 | 12/2007 | Matsubara | |
| 2008/0059569 A1 | 3/2008 | Kanda et al. | |
| 2008/0077660 A1 | 3/2008 | Tomida | |
| 2008/0256477 A1 | 10/2008 | Cho et al. | |
| 2009/0013210 A1 | 1/2009 | McIntosh et al. | |
| 2009/0016641 A1 * | 1/2009 | Paladini et al. | 382/278 |
| 2009/0063972 A1 | 3/2009 | Ma et al. | |
| 2009/0070699 A1 | 3/2009 | Birkill et al. | |
| 2009/0094263 A1 * | 4/2009 | Shiran et al. | 707/101 |
| 2009/0241057 A1 | 9/2009 | Toda | |
| 2009/0264157 A1 | 10/2009 | Hsieh et al. | |
| 2009/0287736 A1 | 11/2009 | Shike et al. | |
| 2009/0287815 A1 | 11/2009 | Robbins et al. | |
| 2009/0327976 A1 | 12/2009 | Williamson et al. | |
| 2010/0150522 A1 | 6/2010 | Schmehl | |
| 2010/0235732 A1 | 9/2010 | Bergman | |
| 2010/0250660 A1 | 9/2010 | Toda et al. | |
| 2011/0145750 A1 | 6/2011 | Yodo et al. | |
| 2012/0062494 A1 | 3/2012 | Hsieh et al. | |

FOREIGN PATENT DOCUMENTS

| | | |
|---|---|---|
| EP | 1503344 | 2/2005 |
| JP | 55-37609 | 3/1980 |
| JP | 56-166548 | 12/1981 |
| JP | 01-272280 | 10/1989 |
| JP | 2-22987 | 1/1990 |
| JP | 05-284368 | 10/1993 |
| JP | 06-326856 | 11/1994 |
| JP | 08-009168 | 1/1996 |
| JP | 08-116545 | 5/1996 |
| JP | 09-044338 | 2/1997 |
| JP | 10-042221 | 2/1998 |
| JP | 10-074173 | 3/1998 |
| JP | 10-320356 | 12/1998 |
| JP | 10-326232 | 12/1998 |
| JP | 11-331610 | 11/1999 |
| JP | 2001-103491 | 4/2001 |
| JP | 2001-127644 | 5/2001 |
| JP | 2002-024567 | 1/2002 |
| JP | 2002-024862 | 1/2002 |
| JP | 2002-049558 | 2/2002 |
| JP | 2003-050694 | 2/2003 |
| JP | 2003-158534 | 5/2003 |
| JP | 2003-198857 | 7/2003 |
| JP | 2003-271508 | 9/2003 |
| JP | 2004-503862 | 2/2004 |
| JP | 2004-086550 | 3/2004 |
| JP | 2004-171063 | 6/2004 |
| JP | 2004-348380 | 12/2004 |
| JP | 2005-027193 | 1/2005 |
| JP | 2005-128279 | 5/2005 |
| JP | 2005-228227 | 8/2005 |
| JP | 2005-267158 | 9/2005 |
| JP | 2006-031476 | 2/2006 |
| JP | 2007-519091 | 7/2007 |
| JP | 2007-241710 | 9/2007 |
| JP | 2008134853 A * | 6/2008 |
| WO | 0197014 A2 | 12/2001 |
| WO | 0197014 A3 | 12/2001 |
| WO | 02/079913 | 10/2002 |
| WO | 0243365 | 5/2005 |
| WO | 2005057353 | 6/2005 |

OTHER PUBLICATIONS

Japanese Office Action for Japanese Patent Application No. 2006-36652 mailed on Feb. 14, 2012.
OA dated Apr. 4, 2012 for U.S. Appl. No. 12/722,876, 42 pages.
OA dated Apr. 13, 2012 for U.S. Appl. No. 11/683,763, 25 pages.
OA dated Feb. 8, 2012 for U.S. Appl. No. 12/405,417, 39 pages.
OA mailed Dec. 8, 2010 for U.S. Appl. No. 11/693,346, 22 pages.
OA dated Jun. 24, 2010 for U.S. Appl. No. 11/844,729, 21 pages.
OA dated Sep. 29, 2010 for U.S. Appl. No. 11/683,763, 21 pages.
Japanese Office Action for Japanese Patent Application No. 2006-095744 mailed on Jun. 7, 2011.
Japanese Office Action for Japanese Patent Application No. 2006-091628 mailed on Jun. 7, 2011.
United States Office Action for U.S. Appl. No. 12/405,417 mailed on Jul. 14, 2011.
Japanese Office Action for Japanese Patent Application No. 2006-063965 mailed on Jun. 6, 2011.
Japanese Office Action for 2008-070365 mailed on Mar. 30, 2010.
Japanese Office Action for 2006-036652 mailed on Apr. 13, 2010.
Office Action for U.S. Appl. No. 11/693,346 mailed on Jun. 3, 2010.
Office Action for U.S. Appl. No. 11/683,763 mailed on Apr. 30, 2010.
Japanese Office Action for Japanese Patent Application No. 2006-036653 mailed on May 31, 2011.

(56) References Cited

OTHER PUBLICATIONS

U.S. Office Action for U.S. Appl. No. 11/693,346 mailed on May 18, 2011.
OA dated Oct. 23, 2012 for U.S. Appl. No. 12/722,876, 17 pages.
Written Opinion of PCT/JP2007/054138 dated Jul. 25, 2007.
International Search Report for PCT/JP2007/054138 dated Jul. 25, 2007.
Office Action for U.S. Appl. No. 11/844,729 mailed on Jun. 11, 2009.
Office Action for U.S. Appl. No. 11/844,729 mailed on Nov. 19, 2009.
U.S. Appl. No. 12/722,876, filed Mar. 12, 2010.
Written Opinion of PCT/JP2007/057511 dated Jul. 23, 2007.
International Search Report for PCT/JP2007/057511 dated Jul. 23, 2007.
Office Action for U.S. Appl. No. 11/693,346 mailed on Sep. 25, 2009.
Japanese Office Action for 2006-036652 mailed on Jan. 26, 2010.
Notice of Allowance mailed Aug. 26, 2013 for U.S. Appl. No. 12/722,876, 29 pages.
Office Action dated Apr. 15, 2013 for U.S. Appl. No. 12/722,876, 21 pages.
Office Action dated Feb. 8, 2013 for U.S. Appl. No. 12/405,417, 43 pages.

* cited by examiner

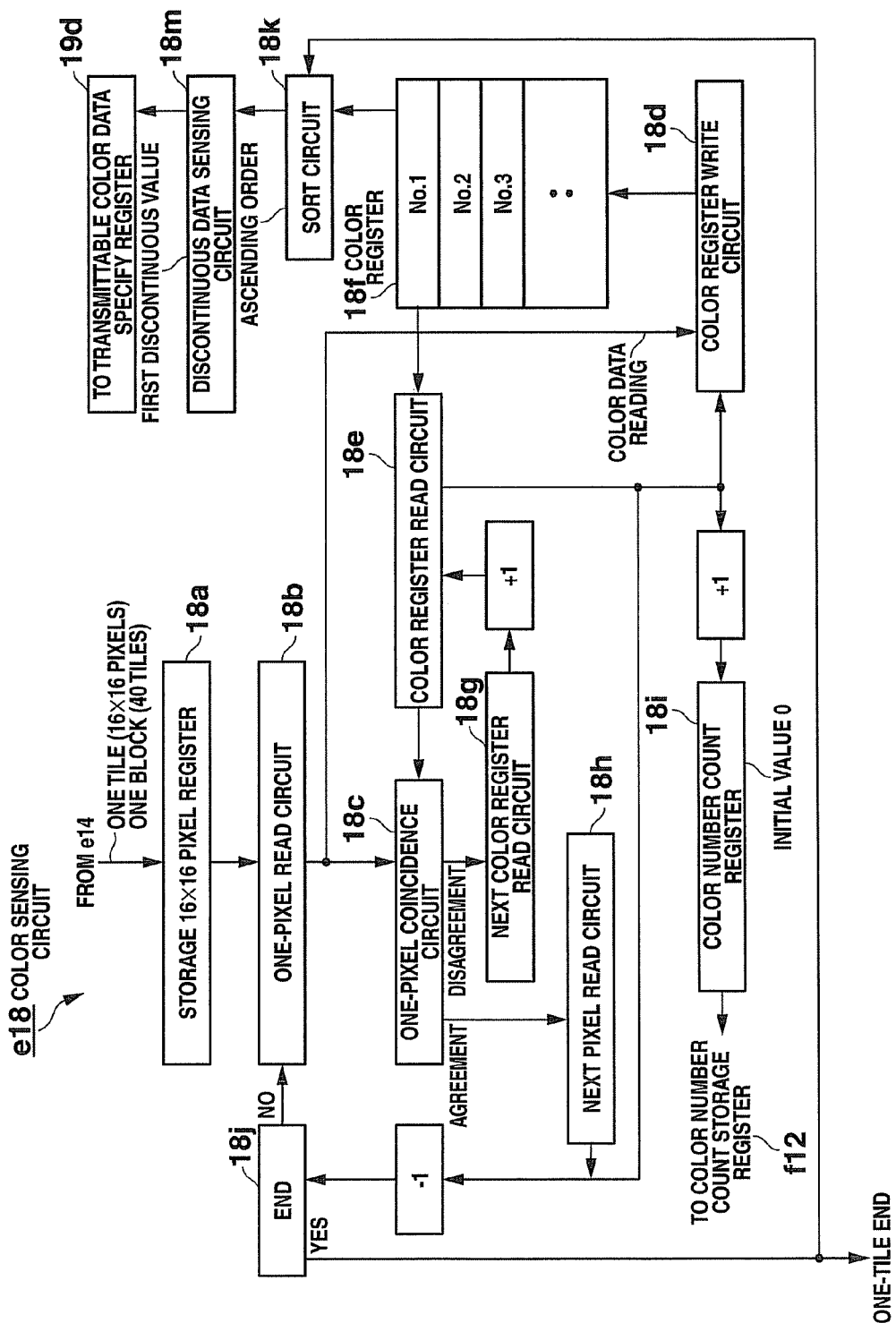

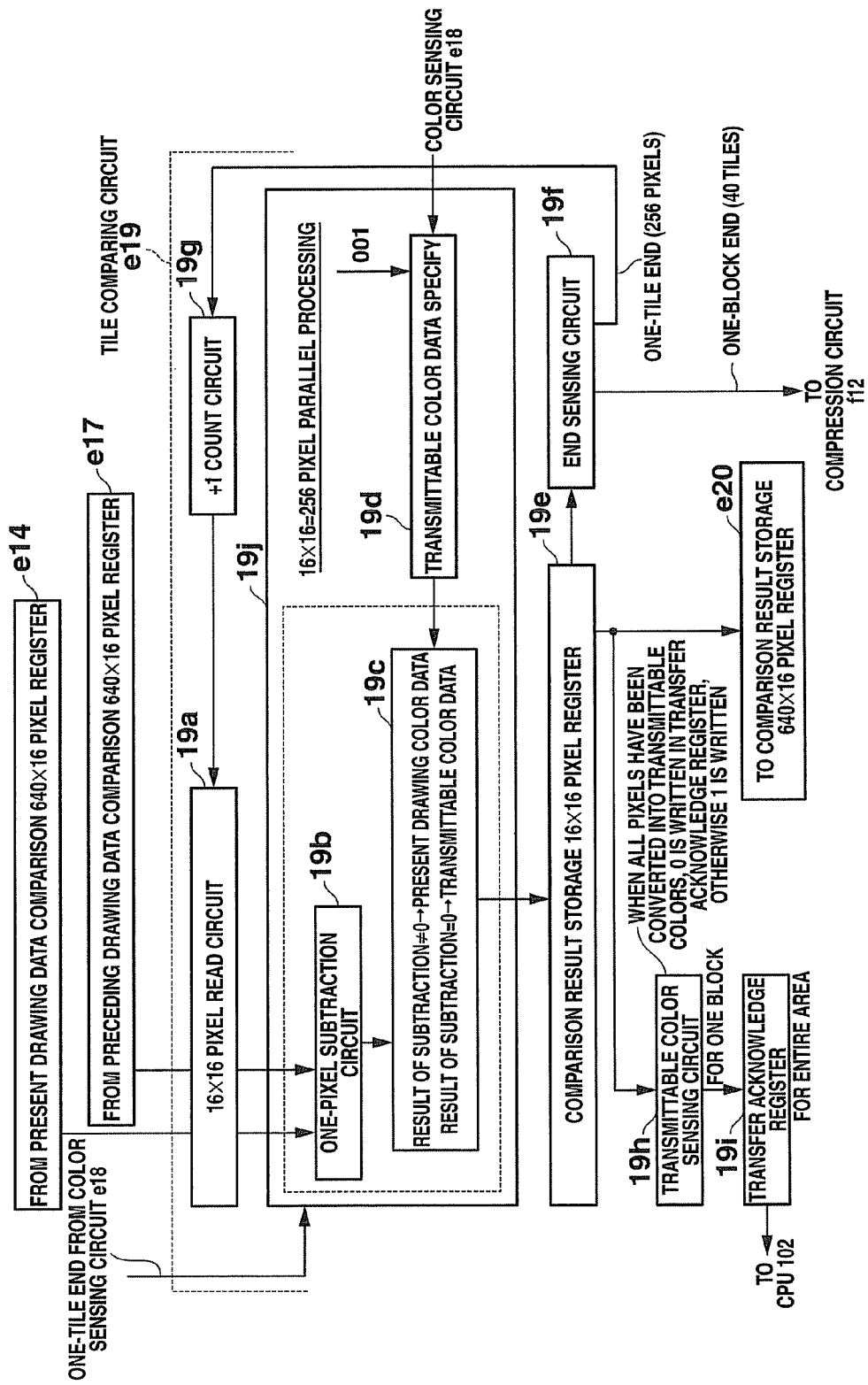

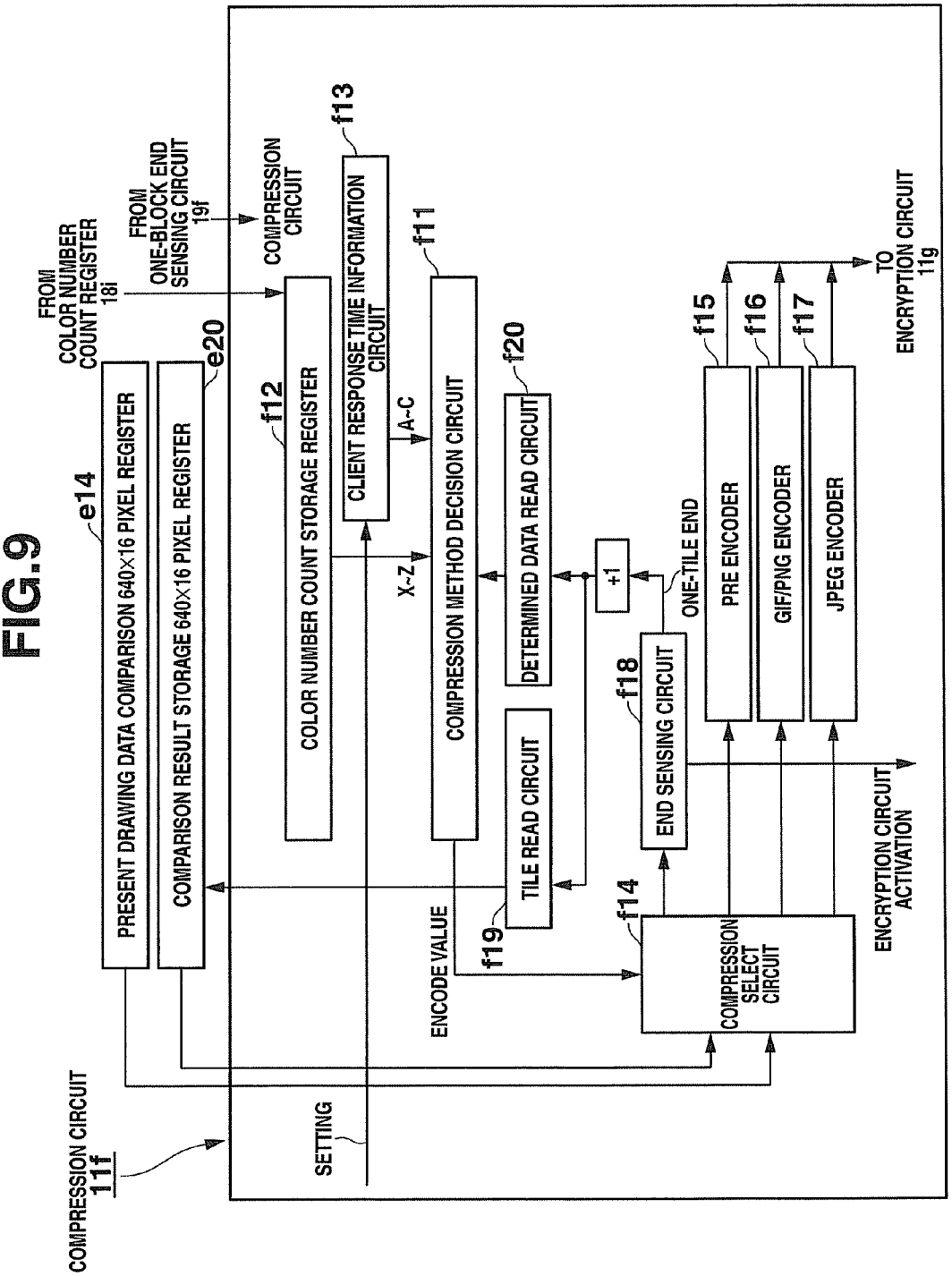

FIG.10 f11T TABLE OF COMPRESSION METHOD DECISION CIRCUIT

A···RESPONSE TIME<100ms
B···RESPONSE TIME<500ms
C···RESPONSE TIME≧500ms
X···NUMBER OF COLORS=1 OR 2
Y···NUMBER OF COLORS<256
Z···NUMBER OF COLORS≧256

| ENCODE VALUE | ENCODE METHOD | A | | | B | | | C | | |
|---|---|---|---|---|---|---|---|---|---|---|
| | | X | Y | Z | X | Y | Z | X | Y | Z |
| R | PRE | O | | | O | | | O | | |
| G | GIF/PNG | | O | | | O | | | O | |
| J9 | JPEG (QUALITY9) | | | O | | | | | | |
| J8 | JPEG (QUALITY8) | | | | | | | | | |
| J7 | JPEG (QUALITY7) | | | | | | | | | |
| J6 | JPEG (QUALITY6) | | | | | | O | | | |
| J5 | JPEG (QUALITY5) | | | | | | | | | |
| J4 | JPEG (QUALITY4) | | | | | | | | | |
| J3 | JPEG (QUALITY3) | | | | | | | | | |
| J2 | JPEG (QUALITY2) | | | | | | | | | |
| J1 | JPEG (QUALITY1) | | | | | | | | | |
| J0 | JPEG (QUALITY0) | | | | | | | | | O |

SERVER APPARATUSES, SERVER CONTROL PROGRAMS, AND CLIENT APPARATUSES FOR A COMPUTER SYSTEM IN WHICH CREATED DRAWING DATA IS TRANSMITTED TO THE CLIENT APPARATUSES

CROSS-REFERENCE TO RELATED APPLICATIONS

This application is based upon and claims the benefit of priority from prior Japanese Patent Applications No. 2006-036652, filed Feb. 14, 2006; and No. 2006-036653, filed Feb. 14, 2006, the entire contents of both of which are incorporated herein by reference.

BACKGROUND OF THE INVENTION

1. Field of the Invention

This invention relates to server apparatuses, server control programs, and client apparatuses in a computer system configured to cause all of the applications input and output at a client personal computer (PC) to run on a server in a client-server system connected via a network, such as a local area network (LAN).

2. Description of the Related Art

Each of the individual PC terminals connected to a network, such as an in-house LAN, has run a document creation application or a spreadsheet application independently and created various files. The various files have been stored in the storage unit of the PC terminal or in an external storage medium, such as a magnetic disk, an optical disk, or a small semiconductor memory, or have been transferred to and stored in a storage unit managed by a server on the network.

In such a conventional client-server system, since the created files are managed in each PC terminal itself, if the PC terminal has been lost or carried out illegally and fallen into the third party's hands, there is a risk that the stored files might be read out and important information or classified information might be leaked.

Moreover, when each PC terminal runs the application independently, the work of updating, changing, and adding the application has to be done on a PC terminal basis, making management troublesome, which results in an increase in the cost.

To overcome this drawback, a recent client-server system has introduced a server-based computing (SBC) system [thin client system] configured to run all the applications input and output at each PC terminal (or client PC) on the server and manage all the created files on the server side (refer to, for example, Jpn. Pat. Appln. KOKAI Publication No. 2004-171063 and Jpn. Pat. Appln. KOKAI Publication No. 2003-158534).

In such a thin client system, the drawing data of the application executed on the server side is transferred to the client PC, which then displays the drawing data (for example, Jpn. Pat. Appln. KOHYO Publication No. 2004-503862).

As described above, in the thin client system, drawing data for the application software program executed on the server side is transferred to the client PC. The drawing data is displayed on the client PC. Therefore, when the amount of drawing data to be processed increases or when the number of client PCs connected to the server increases, the server's burden of transferring the drawing data to the client increases. This causes the following problems: the response speed between the server and the client drops and the number of client PCs to be connected has to be limited drastically.

To overcome the problems, a method of alleviating the processing burden due to the transfer of drawing data by clipping only a rectangular drawing area including the drawing data part updated on one screen and transferring and rewriting the drawing area has been considered as the technique for controlling the display of drawing data by software. However, as the resolution of drawing data has been getting higher and the monitor resolution has improved spectacularly, the amount of data to be processed for the drawing has increased further and therefore the processing burden is required to be alleviated more.

BRIEF SUMMARY OF THE INVENTION

It is an object of the invention to provide a server apparatus, a server control program, and a client apparatus which make it possible to alleviate the processing burden on the server side resulting from the transfer of drawing data between a server and a client.

In the server apparatus (or server control program) for the computer system according to the invention, the present drawing data stored in a present drawing data storage unit is compared with the preceding drawing data stored in a preceding drawing data storage unit for each of the drawing areas divided by an area dividing unit and it is determined whether there is a change in the preceding drawing data for each of the drawing areas in the present drawing data. Then, a control is performed where the drawing data in a drawing area determined to have a change by a comparison decision unit is transmitted to the client apparatus, except for a drawing area of the present drawing data determined to have no change by the comparison decision unit. This makes it possible to remarkably reduce the amount of data transferred to the client apparatus as a result of a change in the drawing and therefore transfer the drawing data at high speed. Moreover, realizing the area dividing unit and the comparison decision unit in a hardware circuit makes it possible to reduce a load on the server CPU for high-speed transfer of drawing data and increase the number of client apparatuses to be connected.

In the client apparatus according to the invention, a drawing area of present drawing data received from the server apparatus is read pixel data item by pixel data item and it is determined whether the pixel data item is specific data with no change in the drawing. The display on the display screen is updated according to a pixel data item other than a pixel data item determined to be specific data by the pixel data decision unit. This causes the pixel data part with no change to be replaced with specific data on the server apparatus side and the drawing area where all of the pixel data has been replaced with the specific data is not transferred, which makes it possible to reduce the amount of transferred data remarkably.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a block diagram showing the configuration of a color sensing circuit e18 of the image comparing circuit 11e in the accelerator circuit 101 of the server apparatus 10;

FIG. 8 is a block diagram showing the configuration of a tile comparing circuit e19 of the image comparing circuit 11e in the accelerator circuit 101 of the server apparatus 10;

FIG. 9 is a block diagram showing the configuration of a compression circuit 11f in the accelerator circuit 101 of the server apparatus 10;

FIG. 10 is a compression method decision table f11T included in a compression method decision circuit f11 in the compression circuit 11f;

DETAILED DESCRIPTION OF THE INVENTION

Figure 1:
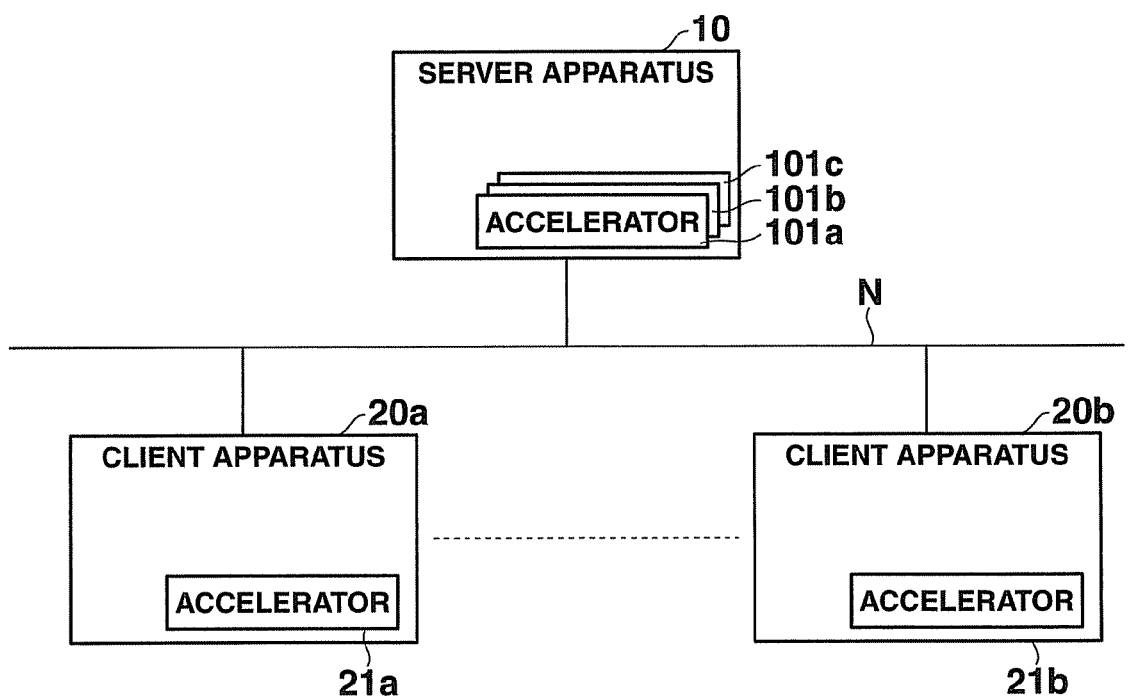
FIG. 1 is a block diagram showing the configuration of a thin client system which includes a server apparatus 10 and its client apparatuses 20a, 20b, . . . according to an embodiment of the invention.

FIG. 1 is a block diagram showing the configuration of a thin client system which includes a server apparatus 10 and its client terminals 20a, 20b, . . . according to an embodiment of the invention.

The thin client system includes a server apparatus 10 and a plurality of client apparatuses 20a, 20b, . . . which are connected to a network N composed of a local area network (LAN) or a wide area network (WAN).

The server apparatus 10 has a plurality of application programs, including a document creating program, a spreadsheet program, a mail handling program, an Internet connection program, and a Web display program, and is activated according to the operation input signal from the client apparatuses 20a, 20b, . . . connected to the server apparatus 10 and executes the process.

In the server apparatus 10, drawing data for display output created as a result of the execution of an application program corresponding to the operation input signals from the client apparatuses 20a, 20b, . . . is not only converted into transfer drawing data by accelerator circuits 101a, 101b, . . . but also compressed by the optimum compression method according to the contents of the drawing data and the state of communication with the client apparatuses 20a, 20b, . . . and transmitted (transferred) to the accessing client apparatuses 20a, 20b, . . . .

Then, in the client apparatuses 20a, 20b, . . . , the drawing data transferred from the server apparatus 10 is decoded at the accelerator circuits (circuit boards) 21a, 21b, . . . of the respective client apparatuses and is displayed on the respective display sections.

Specifically, each of the client apparatuses 20a, 20b, . . . of the thin client system has only an input function corresponding to the user operation on a keyboard or a mouse and an output function, such as an LCD section or a printer, and has neither its own application function nor data file management function.

The data file created by various processes executed at the server apparatus 10 according to the operation input signals from the client apparatuses 20a, 20b, . . . is stored by user account or as a common file in the server apparatus 10 or a storage unit, such as a magnetic disk, managed by the server apparatus 10.

Here, the function of creating transfer drawing data at the accelerator circuits (circuit boards) 101a, 101b, . . . of the server apparatus 10 will be outlined.

Figure 2:
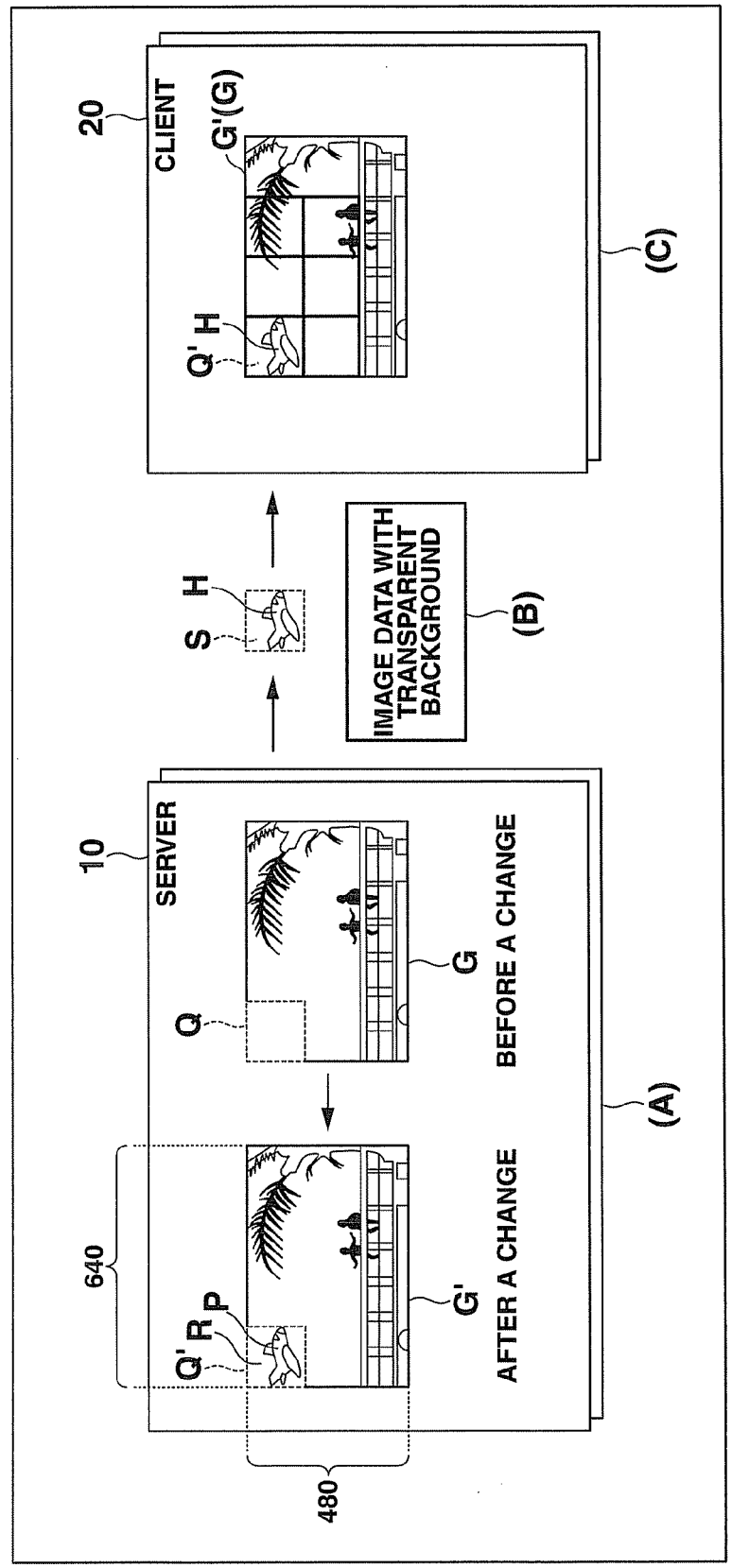
FIG. 2 shows a state where drawing data created at the server apparatus 10 of the thin client system is transferred to the client apparatus 20, (A) showing a change in the drawing data at the server apparatus 10, (B) showing transfer drawing data when the drawing data has changed, and (C) showing the display output state of the transferred drawing data.

FIG. 2 shows a state where drawing data created at the server apparatus 10 of the thin client system is transferred to the client apparatus 20. (A) shows a change in the drawing data at the server apparatus 10. (B) shows transfer drawing data when the drawing data has changed. (C) shows the display output state of the transferred drawing data at the client apparatus.

In the server apparatus 10, when the already created and transferred drawing data (before a change) G has changed to drawing data (after a change) G' according to the running application program, an area Q' corresponding to the changed part P of the drawing data in the changed drawing data G' is clipped and the accelerator circuit 101 converts the drawing data in the changed area Q' into transfer drawing data H as shown by (B) in FIG. 2.

The transfer drawing data H is created by comparing the area Q' clipped according to the changed part P from the changed drawing data G' with the same area Q in the unchanged drawing data G and converting the background coinciding area R into transmittable drawing data (image data) S (color data requiring no rewriting). In the explanation below, although text data, still picture data, and moving picture data, particularly drawing data represented in pixels, are referred to as image data, both are used as almost synonymous words.

In the client apparatus 20, the transfer drawing data H is written in the coordinate position corresponding to the image changed area Q' on the unchanged drawing data G, with the transmittable image data S removed, which enables the drawing data G' after the change to be displayed.

Since the transfer drawing data H created at the accelerator circuit 101 of the server apparatus 10 is compressed and transferred by the optimum compression method in terms of both compression coefficient and image quality selected according to the contents (the number of colors) of the drawing data and the state (response speed) of communication with the client apparatus 20 at that time, the amount of drawing data to be transferred can be reduced further without degrading the drawing quality.

Figure 3:
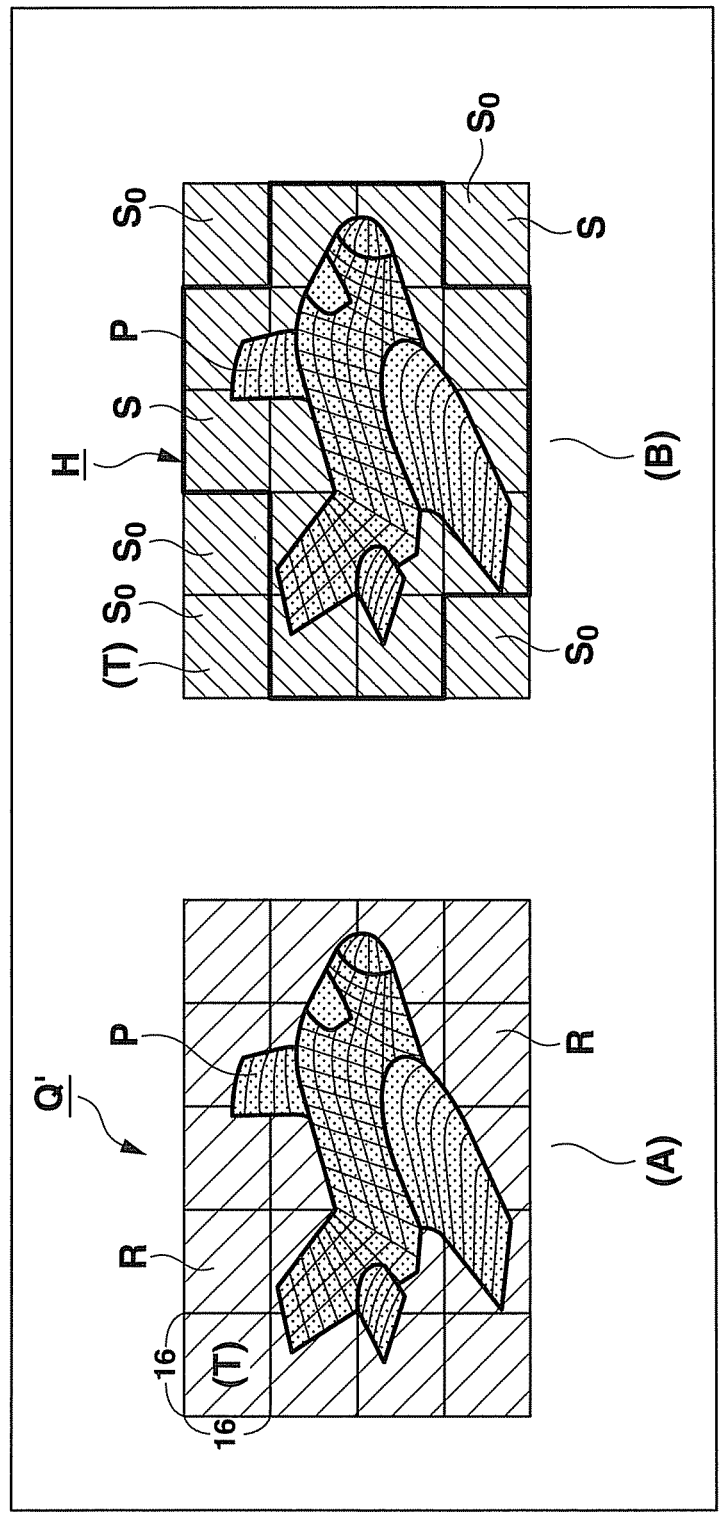
FIG. 3 shows in detail transfer drawing data H created by an accelerator circuit 101 on the basis of an area Q' of changed drawing data G' at the server apparatus 10 of the thin client system.

FIG. 3 shows in detail transfer drawing data H created by the accelerator circuit 101 on the basis of the area Q' of the changed drawing data G' at the server apparatus 10 of the thin client system.

For example, as shown by (A) in FIG. 2, when the area size of drawing data G (G') to be processed at the server apparatus 10 is 480×640 pixels, an area Q' corresponding to the image-changed part P in the changed drawing data G' is clipped in tiles, with 16×16 pixels=one tile (T).

In the area Q' corresponding to the image-changed part P in the changed drawing data G', the areas of tiles T in a horizontal line are collectively called one block.

Although the area Q' is a rectangular area Q' obtained by clipping the image-changed part P in the horizontal and vertical directions, the area size (lateral) clipped only in the horizontal direction may be a strip-shaped area Q', or the area size (640 pixels) of the drawing data G (G') itself.

The accelerator circuit 101 compares, in tiles, the image in the area Q' according to the image change with the image in the area Q in the same position of the unchanged drawing data G and converts the individual pixels in the background coinciding area R into transmittable image data S (color data requiring no rewriting) as shown by (B) in FIG. 3. A transmittable color tile so obtained by converting the entire area of one tile (T) into transmittable color data S is not transferred. After only each tile including the image-changed part P is converted into transfer drawing data H obtained by compressing the area of difference from the unchanged drawing data G, the transfer drawing data H is compressed by the optimum compression method and the resulting data together with the coordinate position of the tile on the display screen is transferred to the client apparatus 20.

The accelerator circuit (circuit board) 21 of the client apparatus 20 decodes the transfer drawing data H obtained by compressing the unchanged drawing data G in tiles and then simply writes the decoded data in the coordinate position of the tile, with the image pixels converted into transmittable data S removed, thereby making it possible to display the changed drawing data G' created at the server apparatus 10.

The accelerator circuit 101 of the server apparatus 10 compresses and encrypts the created transfer drawing data H optimally and transfers the resulting data to the client apparatus 20. For example, in the GIF (Graphics Interchange Format)/PNG (Portable Network Graphics) compression method, if the individual image pixels constituting the image data to be compressed are of the same color, lie next to one another, and are consecutive in a larger area, the compression efficiency can be increased without degrading its picture quality. Accordingly, as described above, the compression ratio of the drawing data area converted into transmittable color data S in the transfer drawing data H is very high.

Therefore, not only can the amount of drawing data transferred from the server apparatus 10 to the client apparatus 20 be made very small without degrading the drawing quality, but also the transfer drawing data H can be created and compressed by hardware at the accelerator circuit (circuit board) 101. Accordingly, the processing burden on the server apparatus 10 can be alleviated remarkably and the increase of client apparatuses 20a, 20b, . . . or the like can be dealt with easily.

Figure 4:
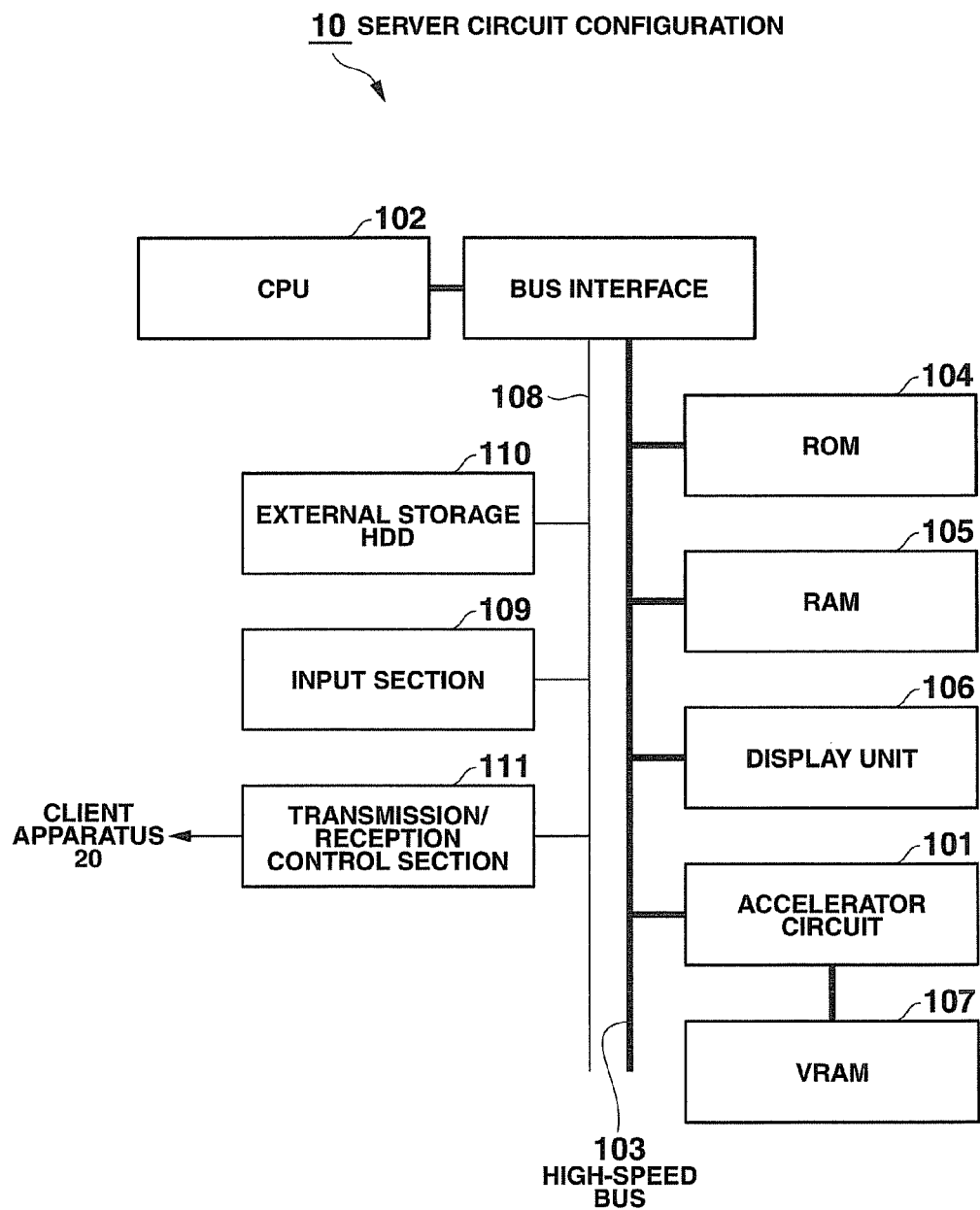
FIG. 4 is a block diagram showing the circuit configuration of the server apparatus 10 in the thin client system.

FIG. 4 is a block diagram showing the circuit configuration of the server apparatus 10 in the thin client system.

The server apparatus 10 includes a CPU 102 serving as a computer. A ROM 104, a RAM 105, and a display unit 106 are connected via a high-speed bus 103 to the CPU 102. The accelerator circuit (circuit board) 101 is further connected to the CPU 102. The accelerator circuit 101 is provided with a VRAM 107.

Further connected via a normal bus 108 to the CPU 102 are an input section 109, such as a keyboard, an external storage HDD (Hard Disk Drive) 110, and a control section 111 for transmission and reception to and from the client apparatus 20.

The CPU 102 controls the operation of various parts of the circuitry using the RAM 105 as a working memory according to the system program and various application programs previously stored in the ROM 104. In the CPU 102, the various programs are started and executed according to the key input signal from the input section 109 or the processing command signals and the like corresponding to the user operation received via the transmission/reception control section 111 from the client apparatus 20.

In the server apparatus 10, various items of data created by the application program started and executed according to the user command signal from the client apparatus 20 are caused to correspond to, for example, the user ID and are stored in the external storage HDD 110. Moreover, display drawing data is converted into transfer drawing data H at the accelerator circuit (circuit board) 101 using the VRAM 107 (see FIGS. 2 and 3). After the transfer drawing data is compressed and encrypted optimally, the resulting data is transferred from the transmission/reception control section 111 to the client apparatus 20.

Figure 5:
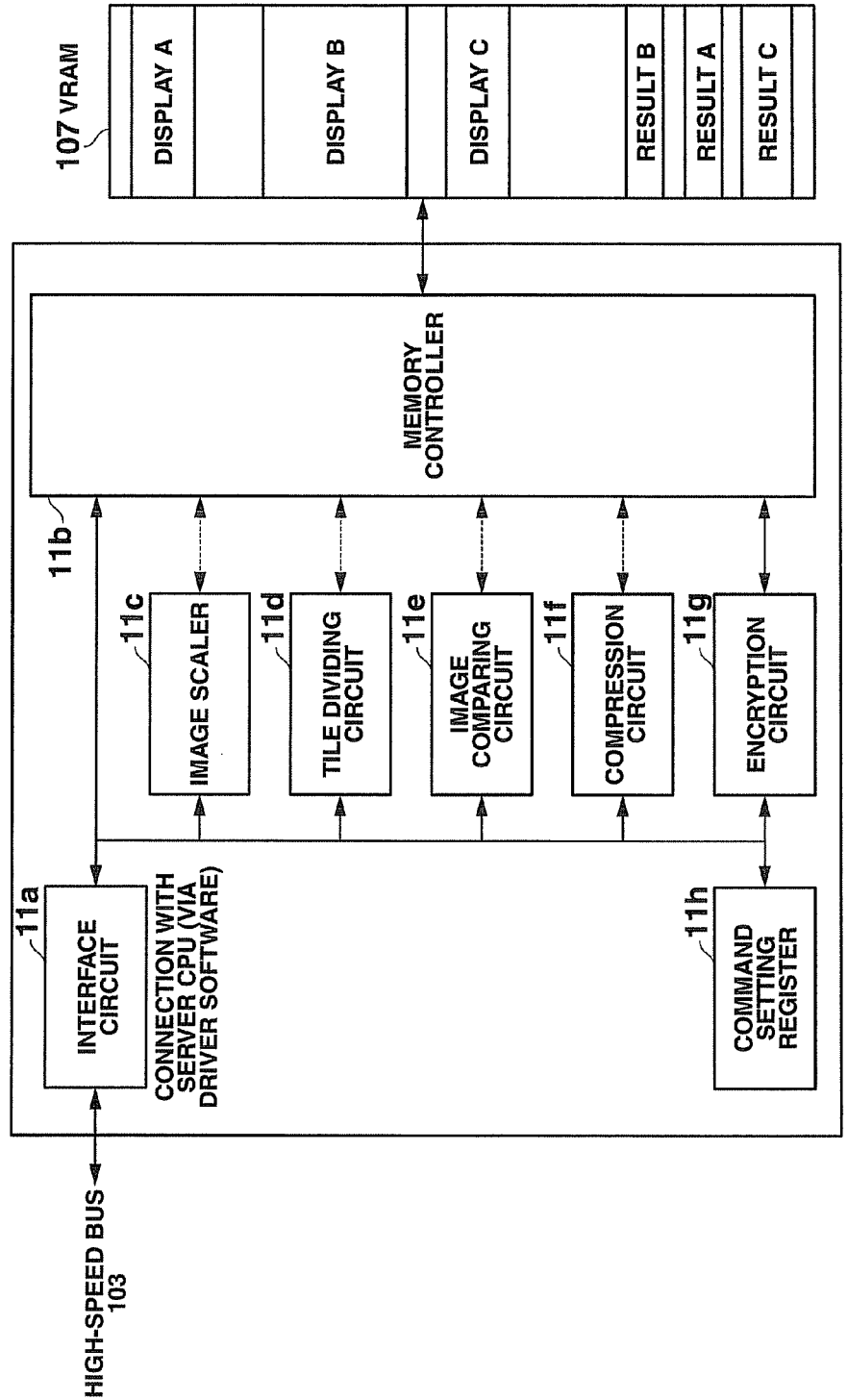
FIG. 5 is a block diagram showing the circuit configuration of the accelerator circuit 101 in the server apparatus 10 of the thin client system.

FIG. 5 is a block diagram showing the circuit configuration of the accelerator circuit 101 in the server apparatus 10 of the thin client system.

The accelerator circuit 101 includes an interface circuit (I/F circuit) 11a connected to the high-speed bus 103 from the server CPU 102. To the I/F circuit 11a, the VRAM 107 is connected via a memory controller 11b.

In the VRAM 107, display drawing data created by each application program started and executed at the CPU 102 according to the operation command signals from the individual client apparatuses 20a, 20b, . . . are allocated and stored as display A, display B, . . . for the respective client apparatuses 20a, 20b, Further in the VRAM 107, transfer drawing data H converted and created at the accelerator circuit 101 on the basis of the individual drawing data items A, B, . . . are compressed and encrypted optimally and the resulting data items are stored as result A, result B.

Between the I/F circuit 11a and the memory controller 11b, an image scaler 11c, a tile dividing circuit 11d, an image comparing circuit 11e, a compression circuit 11f, and an encryption circuit 11g which are for creating transfer drawing data H (result A, result B, . . . ) from the created display drawing data (display A, display B, . . . ) are connected.

The individual circuits 11c to 11g for creating the transfer drawing data H operate according to a command code set in a command setting register 11h via the interface circuit 11a by the CPU 102.

The image scaler 11c is for reducing the drawing data created by an application program corresponding to the operation command signal for each of the client apparatuses 20a, 20b, . . . to the display screen size for each of the client apparatuses 20a, 20b . . . . The drawing data whose size has been adjusted by the image scaler 11c are stored as display A, display B, . . . in the VRAM 107 via the memory controller 11b.

Figure 16:
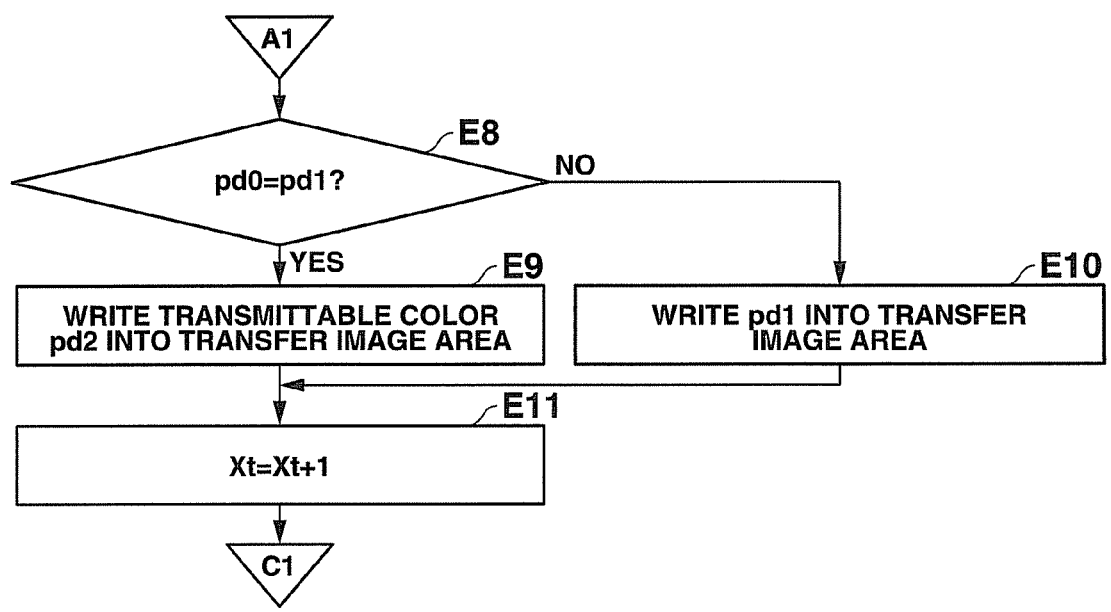
FIG. 16 is a flowchart to help explain a software difference process (part 2) for each divided tile when control is passed to a software process as a result of the transfer data thread process by client at the server apparatus 10.

The tile division circuit 11d is for setting tile division number (length×width pixels per tile) according to the area size and tile-dividing the display drawing data (display A, display B, . . . ) read from the VRAM 107. When the image size of the drawing data (display A) for, for example, the client apparatus 20a read from the VRAM 107 is 480×640 pixels as shown in FIGS. 2 and 3, 16×16 pixels per tile (T) and a tile division is performed.

The area setting size per tile (T) in the tile division may be set to the image size of drawing data, such as 8×8 pixels or 32×32 pixels.

The image comparing circuit 11e is for comparing the changed drawing data G' (see FIG. 2) read from the VRAM 107 with the unchanged drawing data G (see FIG. 2) read from the VRAM 107 in units of one tile (T) divided by the tile dividing circuit 11d and converting the image pixels with no change (difference) into transmittable color data S (see FIG. 3). Each time the conversion of the unchanged image pixels resulting from image comparison in tiles (T) into transmittable color data S has been completed for one block (16 long×640 wide in pixels), the compression circuit 11f compresses the data optimally and the encryption circuit 11g encrypts the compressed data. The encrypted data is stored as a unit image of transfer drawing data H in the VRAM 107. The CPU 102 reads the transfer drawing data and transfers it to the client apparatus 20a.

In this case, an image tile obtained by converting all of the image pixels in one tile (T) into transmittable color data S is not transferred to the client apparatus 20a.

The image comparing circuit 11e, compression circuit 11f, and encryption circuit 11g convert the unchanged pixels of the changed drawing data (present drawing data) G' into transmittable color data and compress and encrypt the data optimally only in a block area including the image-changed part P (see FIG. 2).

Figure 6:
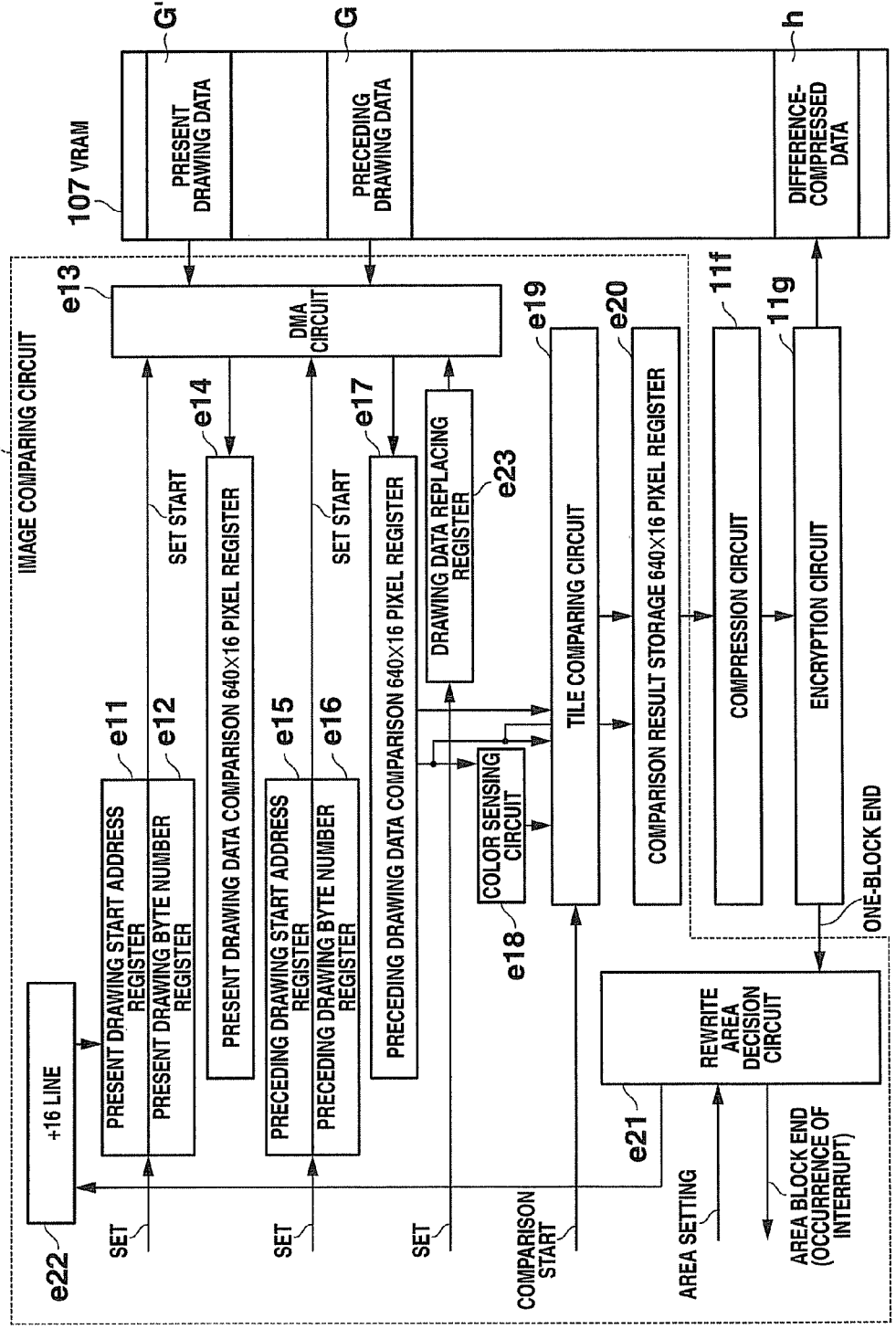
FIG. 6 is a block diagram showing the configuration of an image comparing circuit 11e in the accelerator circuit 101 of the server apparatus 10.

FIG. 6 is a block diagram showing the configuration of the image comparing circuit 11e in the accelerator circuit 101 of the server apparatus 10.

In the VRAM 107, the preceding (unchanged) drawing data G created by the application started according to the operation command signal from the client apparatus 20 and the present (changed) drawing data G' are stored. Further in the VRAM 107, difference-compressed drawing data h (transfer drawing data H) created according to the difference between the present drawing data G' and the preceding drawing data G and compressed and encrypted optimally is stored.

When the CPU 102 sets the start address of and the number of bytes in the present drawing data G' stored in the VRAM 107 in a present drawing start address register e11 and a present drawing byte number register e12, respectively, the begin one block of data (in this case, 640 long×16 wide in pixels: 40 tiles) in the present drawing data G' is set in a present drawing data comparison 640×16 pixel register e14 is set via a DMA circuit e13.

At the same time, when the CPU 102 sets the start address of and the number of bytes in the preceding drawing data stored in the VRAM 107 in a preceding drawing start address register e15 and a preceding drawing byte number register e16, respectively, the beginning one block of data (40 tiles) in the preceding drawing data G is set in a preceding drawing data comparison 640×16 pixel register e17 is set via the DMA circuit e13.

One block of data (40 tiles) of the present drawing data G' set in the present drawing data comparison 640×16 pixel register e14 is read in tiles (16×16 pixels) with 40 tiles in parallel with one another are read into the color sensing circuit e18 (see FIG. 7). While transmittable color data S is specified by the number of colors used in each tile and the sensing of unused colors, 40 tiles are read in parallel with one another in the same tiles into the tile comparing circuit e19 (see FIG. 8).

The tile comparing circuit e19 compares one block of the present drawing data G' read from the present drawing data comparison 640×16 pixel register e14 with one block of the preceding drawing data G read from the preceding drawing data comparison 640×16 pixel register e17 according to a comparison command signal from the CPU 102 in such a manner that drawing color data items are compared pixel by pixel in units of 40 tiles arranged in parallel. Then, the tile comparing circuit e19 replaces the drawing color data on the pixels with no change (difference) in the image of the present drawing one-tile data with transmittable color data S of the corresponding one-tile data specified by the color sensing circuit e18.

One block of data for 40 tiles obtained by replacing the drawing color data on the pixels with no change (difference) in the image with transmittable color data S on a tile basis at the tile comparing circuit e19 is stored in a comparison result storage 640×16 pixel register e20.

One block of data after the conversion of unchanged pixels into transmittable colors stored in the comparison result storage 640×16 pixel register e20 is compressed and encrypted optimally in units of one block of data by the compression circuit 11f and encryption circuit 11g, respectively. The resulting data is stored as difference-compressed drawing data h into the VRAM 107.

In a rewrite area decision circuit e21, the number of block areas including the image-changed part P (see FIG. 2) in the present drawing data G' stored in the VRAM 107 is set by the CPU 102. The rewrite area decision circuit e21 determines whether the input block data coincides with the set number of block areas each time the encryption circuit 11g outputs a one-block end signal. If the input block data does not coincide with the set number of block areas, the rewrite area decision circuit e21 outputs a signal for the comparison of the next block data to a +16 line circuit e22. If the input block data coincides with the set number of block areas, the rewrite area decision circuit e21 outputs to the CPU 102 an area block end signal which notifies the end of the creation of difference-compressed drawing data h in the present (changed) drawing data G'.

The +16 line circuit e22 updates the start address of the present drawing data G' set in the present drawing start address register e11 according to a comparison command signal for the next block data from the rewrite area decision circuit e21 by adding 16 lines corresponding to one tile to the start address in the Y (longitudinal) direction. Although the +16 line circuit e22 has added 16 lines, the number of lines may be set suitably according to the processing unit of drawing data. For example, when processing is done in units of, for example, 32 lines or 64 lines, 32 lines or 64 lines are added, respectively. The storage capacity of the present drawing data comparison 640×16 pixel register e14 and the preceding drawing data comparison 640×16 pixel register e17 and other circuits are set according to the processing unit of drawing data.

A drawing data replacing register e23 replaces the present drawing data G' in the VRAM 107 with the preceding drawing data G via the DMA circuit e13 when the CPU 102 has created and set new present (changed) drawing data G', and writes the new present (changed) drawing data as present drawing data G' over the old one.

FIG. 7 is a block diagram showing the configuration of the color sensing circuit e18 of the image comparing circuit 11e in the accelerator circuit 101 of the server apparatus 10.

The color sensing circuit e18 arranges one block of data (40 tiles) to be read into the tile comparing circuit e19 in the present drawing data G' stored in the present drawing data comparison 640×16 pixel register e14 in such a manner that one block of data is arranged tile by tile in parallel with one another and stores the resulting data into a storage 16×16 pixel register 18a.

Although a processing circuit for one tile has been shown in FIG. 7, the color sensing circuit e18 is composed of as many units of the processing circuit arranged in parallel as correspond to 40 tiles.

One tile of data stored in the storage 16×16 pixel register 18a is read by a one-pixel read circuit 18b pixel by pixel and is not only sent to a one-pixel coincidence circuit 18c but also set in a color register write circuit 18d.

The one-pixel coincidence circuit 18c detects the agreement/disagreement of color data on one pixel read by the one-pixel read circuit 18b with color data on the preceding read pixel in the present one-tile data read from a color register 18f by a color register read circuit 18e.

If the one-pixel coincidence circuit 18c detects the disagreement, a next color register read circuit 18g updates the read position of the color register 18f by the color register read circuit 18e. If the one-pixel coincide circuit 18c detects the agreement, a next pixel read circuit 18h updates the read pixel in the storage 16×16 pixel register 18a by the one-pixel read circuit 18b.

When the read position of the color register 18f has been updated at the color register read circuit 18e because the one-pixel coincide circuit 18c has detected the disagreement, the color data on the disagreement-sensed pixel set in the color register write circuit 18d is additionally stored in the color register 18f and the color number count of the one-tile data in the color-number count register 18i is updated.

Specifically, in one tile unit of data stored in the storage 16×16 pixel register 18a, drawing color data on one pixel read sequentially by the one-pixel read circuit 18b differs from and disagrees with drawing color data on the preceding pixel, the different color data is additionally stored in the color register 18f. Each time the color data is additionally stored, the color number count in the color-number count register 18i is updated.

Then, an END circuit 18j detects the completion of the reading of 256 pixels corresponding to one tile of data and outputs a one-tile end signal. When the one-tile end signal is output, a sort circuit 18k sorts the individual drawing color data items used in this tile stored in the color register 18f in ascending order of color code.

A discontinuous data sensing circuit 18m is for detecting the first color code at which the continuation of the color codes ends and the color codes become discontinuous, in the process of sorting the drawing color codes (color codes) in ascending order at the sort circuit 18k. The first color data in the color codes and unused in the detected tile is determined to be transmittable color data S in the one-tile data and is set in a transmittable color data specify register 19d in the tile comparing circuit e19 (see FIG. 8). Since unused color data in one tile is used as transmittable color data S, data indicating a transmittable color is unnecessary. However, if the code is not used in a bit train representing color codes, a specific code in the codes may be set uniquely as transmittable color data S. Moreover, using a flag, transmittable color data may be determined uniquely. In this case, the color sensing circuit e18 is not needed. Furthermore, when transmittable color data is determined, the smallest color code used in the tile may be detected and used as transmittable color data S.

FIG. 8 is a block diagram showing the configuration of the tile comparing circuit e19 of the image comparing circuit 11e in the accelerator circuit 101 of the server apparatus 10.

The tile comparing circuit e19 of FIG. 8 is composed of as many one-tile processing circuits arranged in parallel as correspond to 40 tiles. As in the color sensing circuit e18, one block of data (40 tiles) read from the present drawing data comparison 640×16 pixel register e14 is processed in parallel on a tile basis.

A 16×16 pixel read circuit 19a reads one tile (16×16 pixels) of data from each of one block of data in the present drawing data G' stored in the present drawing data comparison 640×16 pixel register e14 and one block of data in the preceding drawing data stored in the preceding drawing data comparison 640×16 pixel register e17.

A 256-pixel parallel processing circuit 19j processes drawing color data on the corresponding pixel in parallel for 256 pixels in one tile of data in each of the present drawing data G' read from the 16×16 pixel read circuit 19a and the preceding drawing data G.

A one-pixel subtraction circuit 19b of the 256 pixel parallel processing circuit 19j subtracts drawing color data on the present drawing one pixel from drawing color data on the preceding pixel and outputs the result of the subtraction to a drawing color converting circuit 19c.

If the result of subtracting the drawing color data on the present drawing pixel from the drawing data on the preceding pixel is not "0," that is, if there is a change (difference) in the drawing, the drawing color converting circuit 19c causes the present drawing color data to remain the drawing color data on the pixel. On the other hand, if the result of subtracting the drawing color data on the present drawing one pixel from the drawing data on the preceding pixel is "0," that is, if there is no change (difference) in the drawing, the drawing color converting circuit 19c converts drawing color data on the pixel into transmittable color data S which is a drawing color not found in the tile and is set in a transmittable color data specify register 19d by the color sensing circuit e18.

One tile of data in the present drawing data G' obtained by converting the pixels with no change in the drawing into transmittable data S by the 256-pixel parallel processing circuit 19j is stored in a comparison result storage 16×16 pixel register 19e. This data is stored in parallel with other 39 tiles of data obtained by processing 40 tiles of data in parallel into the comparison result storage 640×16 pixel register e20 in the form of one-block data.

At this time, each time one block (one tile) of data is stored from the comparison result storage 16×16 pixel register 19e storing 40 titles of data in parallel into the comparison result storage 640×16 pixel register e20, the completion of the one-block (one-tile) process is detected by an end sensing circuit 19f.

When detecting the completion of the one-block (one-tile) process, the end sensing circuit 19f outputs the one-tile end signal to a +1 count circuit 19g, thereby updating the reading of the next present drawing block (tile) data from the present drawing 640×16 pixel register e14 by the 16×16 pixel read circuit 19a and the reading of the next preceding drawing block (tile) data from the preceding drawing 640×16 pixel register e17.

Furthermore, the end sensing circuit 19f outputs the one-block end signal to a compression circuit f12, thereby starting an optimum compression operation of the one-block data stored in the comparison result storage 640×16 pixel register e20.

As a result, 40 tiles of each block data including the image-changed part P in the present drawing data G' in the VRAM 107 and 40 tiles of each block data in the corresponding preceding drawing data G are compared in parallel sequentially and the resulting data is stored in the comparison result storage 640×16 pixel register e20.

A transmittable color sensing circuit 19h detects whether all of the pixels (256 pixels) in the tile are tile data with no change in the drawing converted into transmittable color data S for each tile in one-block data obtained by the parallel processing of 40 tiles stored in the comparison result storage 640×16 pixel register e20. Then, the transmittable color sensing circuit 19h writes the detected value for each tile in one block into a transfer acknowledge register 19i in such a manner that a tile (transmittable tile) where the conversion of all the pixels (256 pixels) into transmittable color data S has been sensed is determined to be "0" and the other tiles (drawing tiles) are determined to be "1."

The transfer acknowledge register 19i stores sequentially the detected value "0" or "1" for each tile in one block subjected to the comparing process at the tile comparing circuit e19 and detected block by block at the transmittable color sensing circuit 19h for the entire area of each block data including the image changed part P in the present drawing data G'.

The transmittable tile value "0" or the drawing tile value "1" for each tile in the entire block area corresponding to the image change stored in the transfer acknowledge register 19i is read into the CPU 102 when the difference-compressed drawing data h about the present drawing data G' created by the compared block data (equivalent to 40 tiles) sequentially stored in the comparison result storage 640×16 pixel register e20 is transferred to the client apparatus 20. The tile data with a transmittable tile value of "0" where all the pixels (256 pixels) have been converted into transmittable color data S is not transferred. Only the difference compression tile data with a drawing tile value of "1" is transferred.

FIG. 9 is a block diagram showing the configuration of the compression circuit 11f in the accelerator circuit 101 of the server apparatus 10.

FIG. 10 is a compression method decision table f11T included into compression method decision circuit f11 of the compression circuit 11f.

The compression circuit 11f is for optimally compressing one tile by one tile one-block data compared at the image comparing circuit 11e and sequentially stored in the comparison result storage 640×16 pixel register e20. The compression circuit 11f includes a compression method decision circuit f11.

The compression method decision circuit f11 stores a compression method decision table f11T as shown in FIG. 10.

According to the color number count (X, Y, Z) of each of the 40 tiles in one-block drawing data detected by the color sensing circuit (see FIG. 7) e18 and stored in a color number count storage register f12 and the communication response time (A, B, C) from the present client apparatus 20 set in a client response time information circuit f13, the compression method decision circuit f11 determines optimally on any one of the PRE (Rise-and-Run-length Encoding) method, the GIF (Graphics Interchange Format)/PNG (Portable Network Graphics) encoding method, and the JPEG (Joint Photographic Coding Experts Group) encoding method as a method of compressing data one tile by one tile in one-block data sequentially stored in the comparison result storage 640×16 pixel register e20. An encode value signal for specifying the encoding method optimally determined by the compression method decision circuit f11 is output to a compression select circuit f14.

In the compression method decision table f11T shown in FIG. 10, in a case (X) where the color number count of the tile read from the color number count storage register f12 is as small as one or two colors in one-tile data to be compressed read from the comparison result storage 640×16 pixel register e20, the RRE encoding method which has a high compression efficiency when adjacent pixels have a high same-color continuity is set as the compression method, regardless of the response time (A, B, C) of the client apparatus 20. Moreover, in a case (Y) where the color number count is three or more and less than 256 colors, the GIF/PNG encoding method which has a high compression efficiency when adjacent pixels have a high same-color continuity giving priority to image quality is set as the compression method.

On the other hand, in a case (Z) where the color number count of the tile read from the color number count storage register f12 is as large as 256 or more colors, (A) if the response time of the client apparatus 20 is less than 100 ms, which enables a high-speed transfer communication state, the JPEG encoding method (Quality 9) with low compression (high quality) is determined, (B) if the response time is less than 500 ms, which enables a normal transfer speed, a JPEG encoding method (Quality 6) with normal compression is determined, and (C) if the response time is equal to or faster than 500 ms, which enables slow-speed transfer, a JPEG encoding method (Quality 0) with high compression (low quality) is determined. Here, Quality means the image quality of the result of the processing. When Quality is low (close to 0), this means that the image quality is low and the compression ratio is high. When Quality is high (close to 9), this means that the image quality is relatively high and the compression ratio is relatively low.

According to the encode value optimally determined and output on the basis of the compression method decision table f11T from a compression method decision circuit f11, the compression select circuit f14 selectively distributes and outputs one-tile data to be compressed read from the comparison result storage 640×16 pixel register e20 or present drawing data comparison 640×16 pixel register e14 to an RRE encoder f15, a GIF/PNG encoder f16, or a JPEG encoder f17.

When the JPEG encoding method (Quality 9 to Quality 0) at the JPEG encoder f17 is a lossy compression method, the decoded drawing data cannot be restored in pixels completely to its original state.

Therefore, the JPEG encoding method (Quality 9 to Quality 0) is determined on the basis of the compression method decision table f11T (see FIG. 10). Only in a case (Z) where the color number count of a tile to be compressed is very large, or 256 or more colors, as when the compression method decision circuit f11 outputs encode values J9 to J0, the compression select circuit f14 selects the present drawing data comparison 640×16 pixel register e14 and the corresponding tile data in the present drawing one-block data not converted (difference-compressed) into transmittable color data S by the tile comparing circuit e19 is set to the JPEG encoder f17, which compresses the data optimally.

On the other hand, when the JPEG encoding method (Quality 9 to Quality 0) at the JPEG encoder f17 is a lossless compression method, such as JPEG 2000, the decoded drawing data can be restored in pixels completely to its original state. Thus, one-tile data to be compressed is read from one-block data in the comparison result storage 640×16 pixel register e20 converted (difference-compressed) into transmittable color data S by the tile comparing circuit e19.

The selecting operation for one-tile data by the compression select circuit f14 is detected by an end sensing circuit f18. According to a one-tile end sense signal output from the end sensing circuit f18, not only does a tile read circuit f19 output a next one-tile read command signal to the comparison result storage 640×16 pixel register e20, but a determined data read circuit f20 also outputs a determined compression method read command signal for the next tile to be compressed to the compression method decision circuit f11.

In this way, one-tile data compressed sequentially by the RRE encoder f15, GIF/PNG encoder f16, or JPEG encoder f17 is output to a sequence encryption circuit 11g, which encrypts the data and stores the resulting data as difference-compressed drawing data h in the VRAM 107 each time one block has been finished.

Specifically, the difference-compressed drawing data h in the VRAM 107 is created by writing transmittable color data S into the pixels with no change in the drawing on a tile basis for each block in the n block data clipped according to the image-changed part P from the preceding data G in the present drawing data G' and then compressing and encrypting the resulting data optimally in terms of compression ratio and image quality.

In each type of compression method at the compression circuit 11f, as the individual pixel data items adjacent to one another constituting the one-tile drawing data are consecutive longer as the same pixel data, the compression ratio becomes higher. Therefore, writing transmittable color data S into the pixels with no change in the drawing enables the one-tile drawing data to be compressed with a high compression ratio without degrading the drawing quality.

Next, the control process carried out by the CPU 102 of the server apparatus 10 of the thin client system configured as described above will be explained.

Figure 11:
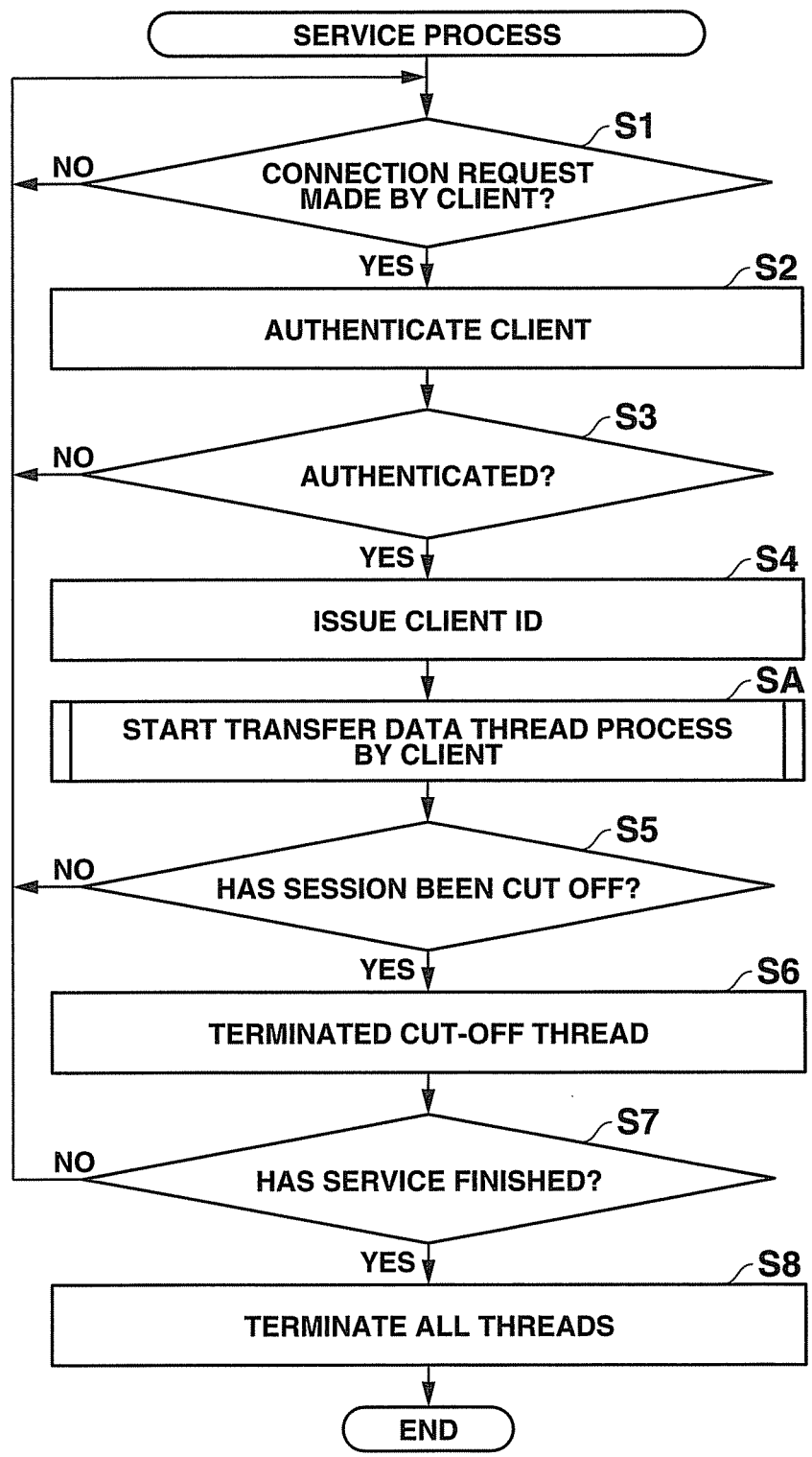
FIG. 11 is a flowchart to help explain an overall operation control in the server apparatus 10 of the thin client system.

FIG. 11 is a flowchart to help explain an overall operation control in the server apparatus 10 of the thin client system.

When the server apparatus 20 has received a connection request signal from the client apparatuses 20a, 20b, . . . (step S1), the client apparatuses 20a, 20b, . . . requesting the connection are authenticated on the basis of confirmation and collation, such as IDs or passwords (step S2).

If it is determined that the authentication is acceptable (step S3), the IDs for the client apparatuses 20a, 20b, . . . authenticated as acceptance are issued (step S4). A transfer data thread process for each connected client apparatus (see FIG. 12) is started, thereby starting and executing applications corresponding to various requests from the client apparatuses 20a, 20b, . . . and creating and transmitting and receiving the resulting data (step SA).

When a disconnection request has been received from the client apparatus 20 in the connecting process (step S5), the process of creating data and transmitting and receiving the data to and from the client apparatus 20a requesting the disconnection is terminated (step S6).

Thereafter, if the end of service to the individual client apparatuses 20a, 20b, . . . is determined as a result of the shutdown of the server apparatus 10 (step S7), the process of creating data and transmitting and receiving the data to and from all the connected client apparatuses 20a, 20b, . . . is terminated (step S8).

Figure 12:
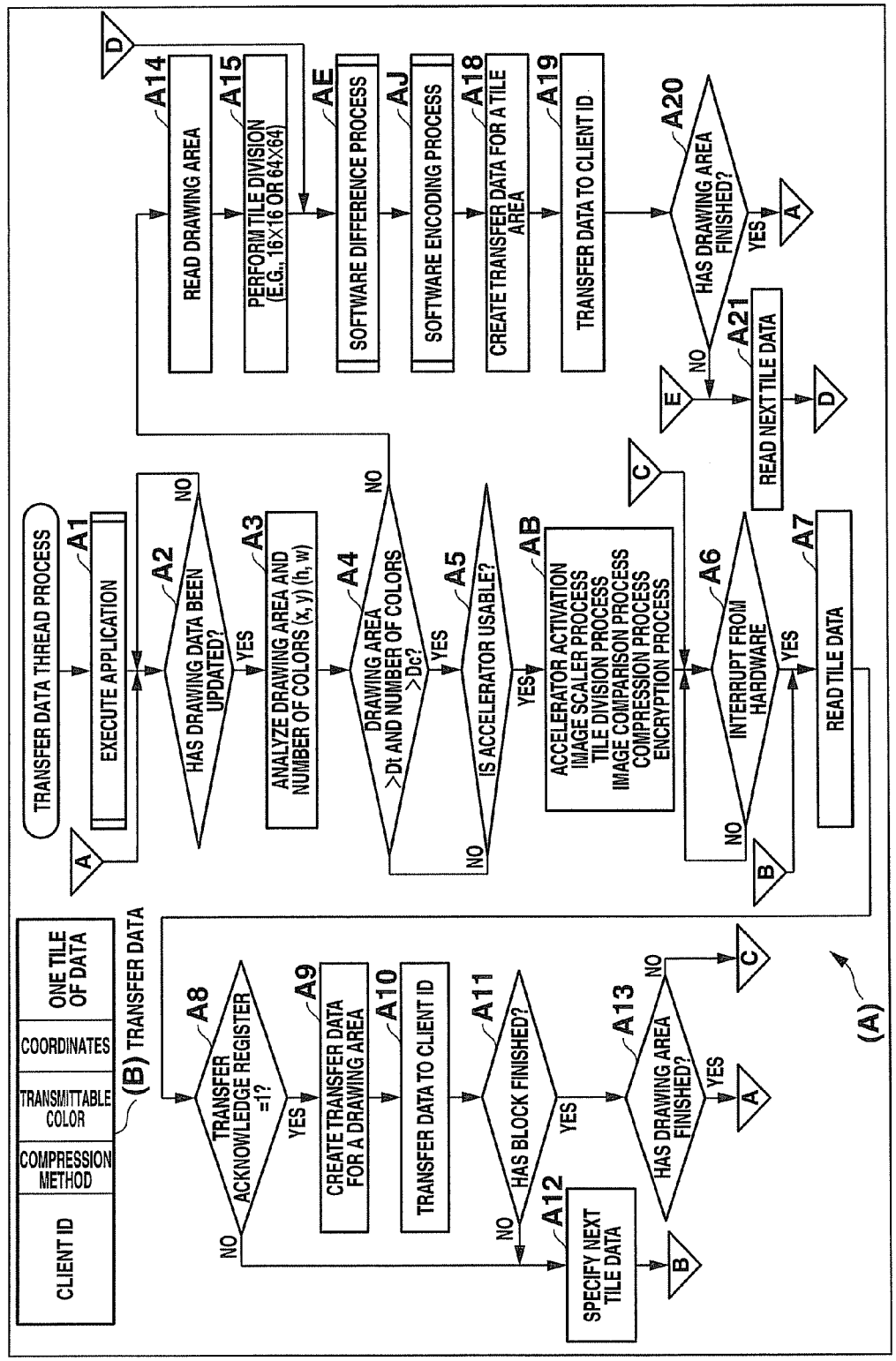
FIG. 12 shows a transfer data thread process by client (step SA) accompanying a service process in the server apparatus, (A) showing its flowchart and (B) showing a transfer data format in tiles.

FIG. 12 shows a transfer data thread process by client (step SA) accompanying a service process in the server apparatus 10, (A) showing its flowchart and (B) showing a transfer data format in tiles.

In the transfer data thread process, when the applications according to various requests from the connected client apparatuses 20a, 20b, . . . are started and executed and the process of creating data and transmitting and receiving the data is carried out (step A1), for example, as shown by (A) in FIG. 2, if it has been determined that, for example, the present drawing data G' has been updated with respect to the preceding drawing data G (step A2), the starting point coordinates (X,Y) of the drawing area Q' corresponding to the image changed part P resulting from the drawing update, the horizontal and vertical size (h, w), and its number of drawing colors are analyzed (step A3). Then, it is determined whether the area size of the drawing area Q' is larger than a preset area size Dt and/or the number of drawing colors is larger than a preset number of colors Dc (step A4).

If it has been determined that the area size of the drawing area Q' of an image change in the present drawing data G' is larger than the preset area size Dt and/or the number of drawing colors is larger than the preset number of colors Dc, it is expected that the processing burden on the server apparatus 10 will be heavier. In the hardware process mainly carried out by the accelerator circuit (circuit board) 101 explained in FIGS. 4 to 11 as a result of the control processes in step A5 to step A13, the difference-compressed drawing data h corresponding to the drawing area Q' is created and compressed and encrypted optimally and the data is transferred to the client apparatus 20 corresponding to the execute application (step A4→A5 to A13).

On the other hand, if it has been determined that the area size of the drawing area Q' of an image change in the present drawing data G' is equal to or smaller than the preset area size Dt and/or the number of drawing colors is equal to or smaller than the preset number of colors Dc, it is expected that the processing burden on the server apparatus 10 will be lighter. In the software process mainly composed of a software difference process (FIGS. 15 to 17) and a software optimum encoding process (FIG. 18) explained later in step A14 to step A21, the difference-compressed drawing data h corresponding to the drawing area Q' is created and compressed and encrypted optimally and the data is transferred to the client apparatus 20 corresponding to the execute application (step A4 A14 to A21).

First, when it has been determined that the area size of the drawing area Q' of an image change in the present drawing data G' is larger than the preset area size Dt and/or the number of drawing colors is larger than the preset number of colors Dc, if control is passed to the hardware process mainly carried out by the accelerator circuit (circuit board) 10 (step A4 (YES)), it is determined whether the accelerator circuit 101 of the server apparatus 10 is idle and usable (step A5). If it has been determined that the accelerator circuit 101 can be used, the accelerator circuit 101 is started up (step A5→AB).

Figure 13:
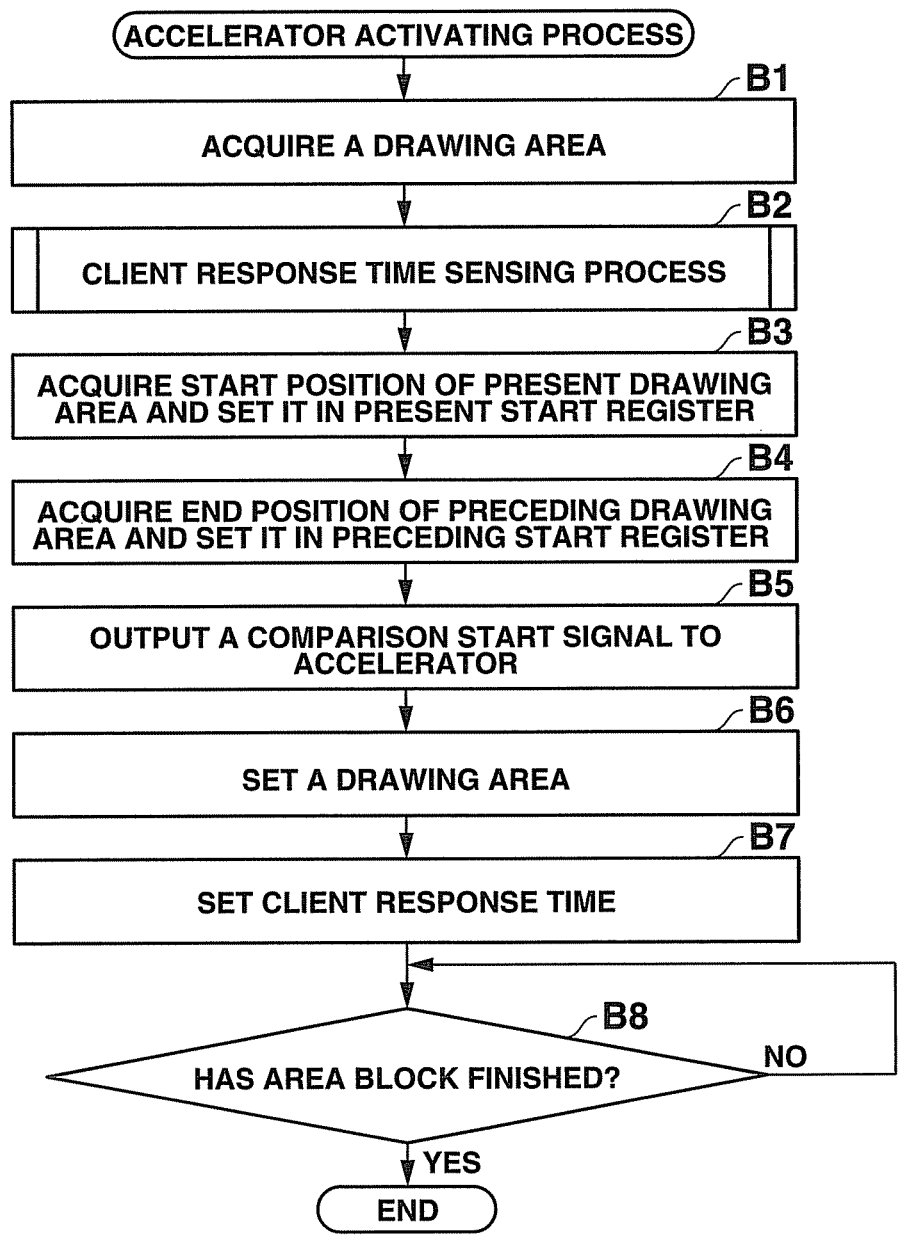
FIG. 13 is a flowchart to help explain an accelerator circuit activating process executed when the accelerator circuit 101 of the server apparatus 10 is started.

FIG. 13 is a flowchart to help explain an accelerator circuit activating process executed when the accelerator circuit 101 of the server apparatus 10 is started.

When the starting point coordinates (X, Y) of and the horizontal and vertical size (h, w) of the drawing area Q' corresponding to the image changed part P of the present drawing data G' created by the running application according to the operation command signal from the client apparatus 20 are obtained (step B1), the communication response time of the client apparatus 20 corresponding to the running application is detected (step B2 (see FIG. 14)).

Figure 14:
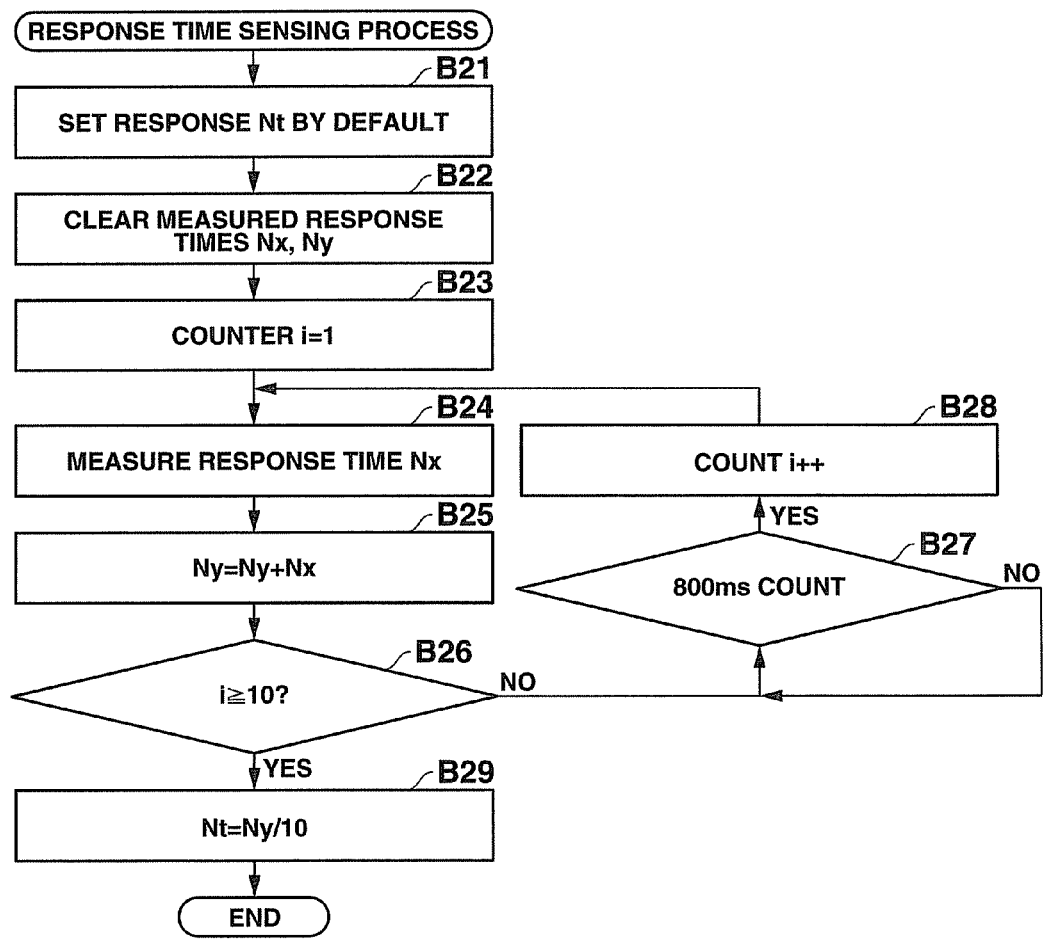
FIG. 14 is a flowchart to help explain a response time sensing process accompanying the accelerator circuit activating process at the server apparatus 10.

FIG. 14 is a flowchart to help explain a response time sensing process accompanying the accelerator circuit activating process at the server apparatus 10.

First, not only is a predetermined response time Nt set by default (step B21), but measured response times Nx, Ny are also cleared (step B22), thereby initializing counter i to 1 (counter i=1) (step B23).

Then, the communication response time Nx of the client apparatus 20 is measured and stored temporarily (step B24) and then is added to the total measured response time Ny up to the preceding measurement, thereby calculating a new total measured response time Ny (step B25). The counter i is counted up (step B28) at regular intervals of time, for example, at intervals of 800 ms, (step B27) ten times, thereby calculating a total measured response time Ny (step B24 to step B26).

The measuring time interval 800 ms of the response time (step B27) has to be set longer than the response time decision condition 500 ms in the compression method decision table f11T (see FIG. 10).

When the total measured response time Ny for ten times has been calculated in the repetitive processing in step B24 to step B28, the total measured response time Ny is divided by "10," thereby calculating its average response time Nt (step B26→step B29).

Then, the start address of and the number of bytes in the drawing area Q' corresponding to the image change in the present drawing data G' stored in the VRAM 107 are set in the present drawing start address register e11 and its present drawing byte number register e12 in the image comparing circuit 11e (see FIG. 6) of the accelerator circuit 101, respectively (step B3). At the same time, the start address of and the number of bytes in the preceding drawing data G corresponding to the image-changed drawing area Q' are set in the preceding drawing start address register e15 and its preceding drawing byte number register e16 in the same image comparing circuit 11e, respectively (step B4).

Then, a comparison start signal is output to the tile comparing circuit e19 of the image comparing circuit 11e in the accelerator circuit 101 (step B5). At the same time, the number of block areas corresponding to the image changed drawing area Q' in the present drawing data G' is set in the rewrite area decision circuit e21 of the same image comparing circuit 11e (step B6).

The response time information Nt measured in the process of detecting the communication response time of the client apparatus 20 in step B2 (see FIG. 14) is set in the client response time information circuit f13 of the compression circuit (see FIG. 9) in the accelerator circuit 101 (step B7).

Accordingly, in the accelerator circuit 101, the image scaler process at the image scaler 11c, the tile division process at the tile dividing circuit 11d, the image comparing process at the image comparing circuit 11e, the optimum compression process at the compression circuit 11f, and the encryption process at the encryption circuit 11g are carried out in a hardware circuit as explained in FIGS. 5 to 10. As a result, difference-compressed drawing data h is created for each block (40 tiles) of data corresponding to the image-changed drawing area Q' in the present drawing data G' and the resulting data is stored sequentially into the VRAM 107 (step AB).

In the accelerator circuit activating process, difference-compressed drawing data h is created for each of the block areas corresponding to the image-changed drawing area Q' in the present drawing data G'. According to the last one-block end signal, the rewrite area decision circuit e21 outputs an area block end signal, thereby completing the series of processes (step B8→END).

In the hardware process (step AB) at the accelerator circuit 101, when an interrupt signal indicating the end of one block is generated (step A6), one-tile data in the one block of difference-compressed data h is read (step A7) and, at the same time, the transmittable color detected value (transmittable tile value "0" or drawing tile value "1") corresponding to the one tile stored in the transfer acknowledge register 19i (see FIG. 8) is read. Then, it is determined whether the detected value is the drawing tile value "1" including a drawing-changed image pixel or the transmittable tile value "0" obtained by converting all the image pixels into transmittable color data S (step A8).

If it has been determined that the drawing tile value "1" indicating one-tile data read from one block of difference-compressed data includes a drawing-changed image pixel has been read from the transfer acknowledge register 19i (step A8 (YES)), the one-tile data is created as transfer data to whose header the coordinates on the present drawing data G', the transmittable color code, the compression method, and the forwarding client ID are added as shown by (B) in FIG. 12 (step A9). The one-tile data is then transferred to the client apparatus 20 with the ID shown in the header (step A10).

Here, if it has been determined that all of the tiles (40 tiles) in one block of difference-compressed data h have not been transferred yet (step A11 (NO)), the next one-tile data in the same block of data is specified (step A12) and the next one-tile data in the one block of difference-compressed data h is read (step A7).

On the other hand, in step A8, if it has been determined that the transmittable tile value "0" indicating all the image pixels have been converted into transmittable color data S has been read from the transfer acknowledge register 19i in the one-tile data read from one block of difference-compressed data h in step A8 (step A8 (NO)), the one-tile data is not transferred and the next one-tile data in the same block of data is specified (step A12), thereby reading the next one-tile data in the one block of difference-compressed data h (step A7).

Then, for the next one-tile data sequentially read from the same block of difference-compressed data h, the process of creating transfer data in the one-tile data and the process of transmitting the data to the client apparatus 20 when the drawing tile value "1" has been read from the transfer acknowledge register 19i (step A8 to step A12), or the process of not transferring the one-tile data when the transmittable tile value "0" has been read from the transfer acknowledge register 19i (step A8→step A12) are carried out repeatedly.

Thereafter, if it has been determined that all the tiles (40 tiles) of one block of difference-compressed data h created by the accelerator circuit 101 have been transferred (step A11 (YES)), it is determined whether the tile-unit transfer of all the blocks of difference-compressed drawing data h created on the basis of the image-changed drawing area Q' has been completed, depending on whether the rewrite area decision circuit e21 of the image comparing circuit 11e has generated an area block end signal (step A13).

Here, since the rewrite area decision circuit e21 has generated no area block end signal, it is determined that the tile-unit transfer of all the blocks of difference-compressed drawing data h has not been completed (step A13 (NO)), the accelerator circuit 101 is waited for to output one-block end signal (step A6).

Then, when a one-block end signal indicating the generation end of the next block of difference-compressed drawing data h in the image-changed drawing area Q' is generated in the same hardware process (step AB) at the accelerator circuit 101 (step A6 (YES)), the process of creating transfer data in the one-tile data and the process of transmitting the data to the client apparatus 20 when the drawing tile value "1" has been read from the transfer acknowledge register 19i (steps A7, A8 to step A12), or the process of not transferring the one-tile data when the transmittable tile value "0" has been read from the transfer acknowledge register 19i (steps A7, A8→step A12) are carried out repeatedly for one-tile data sequentially read from the one block of difference-compressed data h.

In this way, difference-compressed data h for each block (40 tiles) corresponding to the image-changed drawing area Q' in the present drawing data G' created by the accelerator circuit 101 is transferred or not transferred to the client (ID) unit 20 according to the drawing tile value "1" or the transmittable tile value "0" on a one-tile basis.

Thereafter, if it can been determined that the tile-unit transfer of all the blocks of difference-compressed drawing data h created by the accelerator circuit 101 has been completed because the rewrite area decision circuit e21 of the image comparing circuit 11e has generated an area block end signal (step A13 (YES)), control returns to step A2, where the update of the next data is waited for to be determined as a result of the execution of the application.

Accordingly, with the server apparatus 10 configured as described above, the hardware process at the accelerator circuit 101 makes it possible to create as transfer data at high speed the difference-compressed drawing data h obtained by writing transmittable color data S into the unchanged image pixels in tiles in the image-changed drawing area Q' in the present drawing data G' and compressing the resulting data optimally. In addition to this, the transmittable detected tile "0" obtained by converting all the image pixels in one tile into transmittable color data S is not transferred to the client apparatus 20. Only the drawing detected tile "1" with a change in the image is transferred. Only a changed tile division part is extracted from the preceding drawing data G in the updated present drawing data G' and is compressed optimally, thereby realizing a minimum amount of transfer data, while maintaining the image quality. Further, it is possible to transfer the drawing data created and updated by the application to the client apparatus at a high speed with a high quality.

On the other hand, in step A4, if it has been determined that the area size of the image-changed drawing area Q' in the present drawing data G' is equal to or smaller than the preset area size Dt and/or the number of drawing colors is equal to or smaller than the preset number of colors Dc, control is passed to the software process mainly composed of a software difference process (FIGS. 15 to 17) and a software optimum encoding process (FIG. 18) explained later (step A4 (NO)). In this case, the drawing area Q' corresponding to the image change is read (step A14) and tile division is performed in such a manner that a 16×16 pixel area or a 64×64 pixel area is assigned to one tile (step A15).

Figure 15:
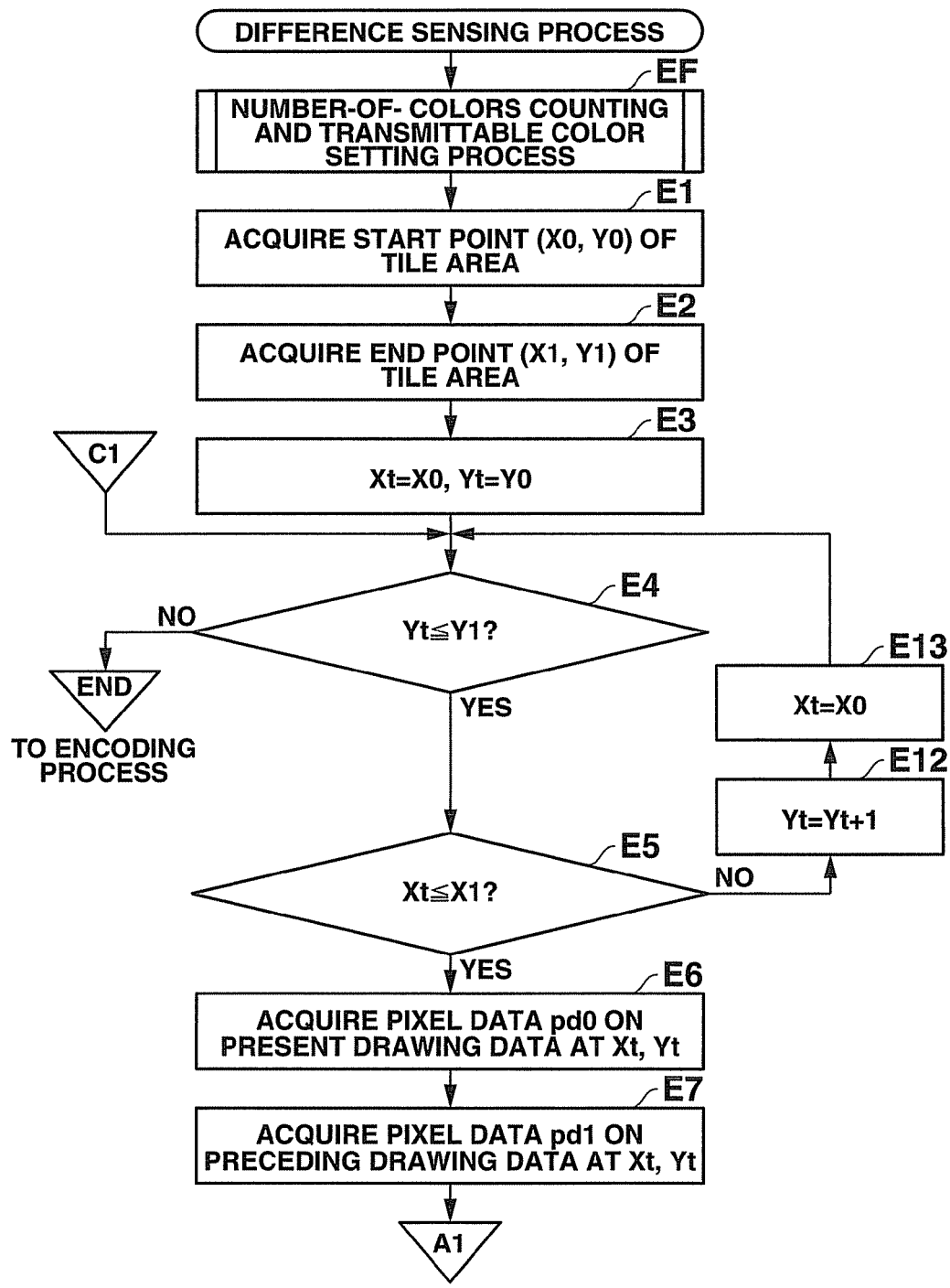
FIG. 15 is a flowchart to help explain a software difference process (part 1) for each divided tile when control is passed to a software process as a result of the transfer data thread process by client at the server apparatus 10.
Figure 17:
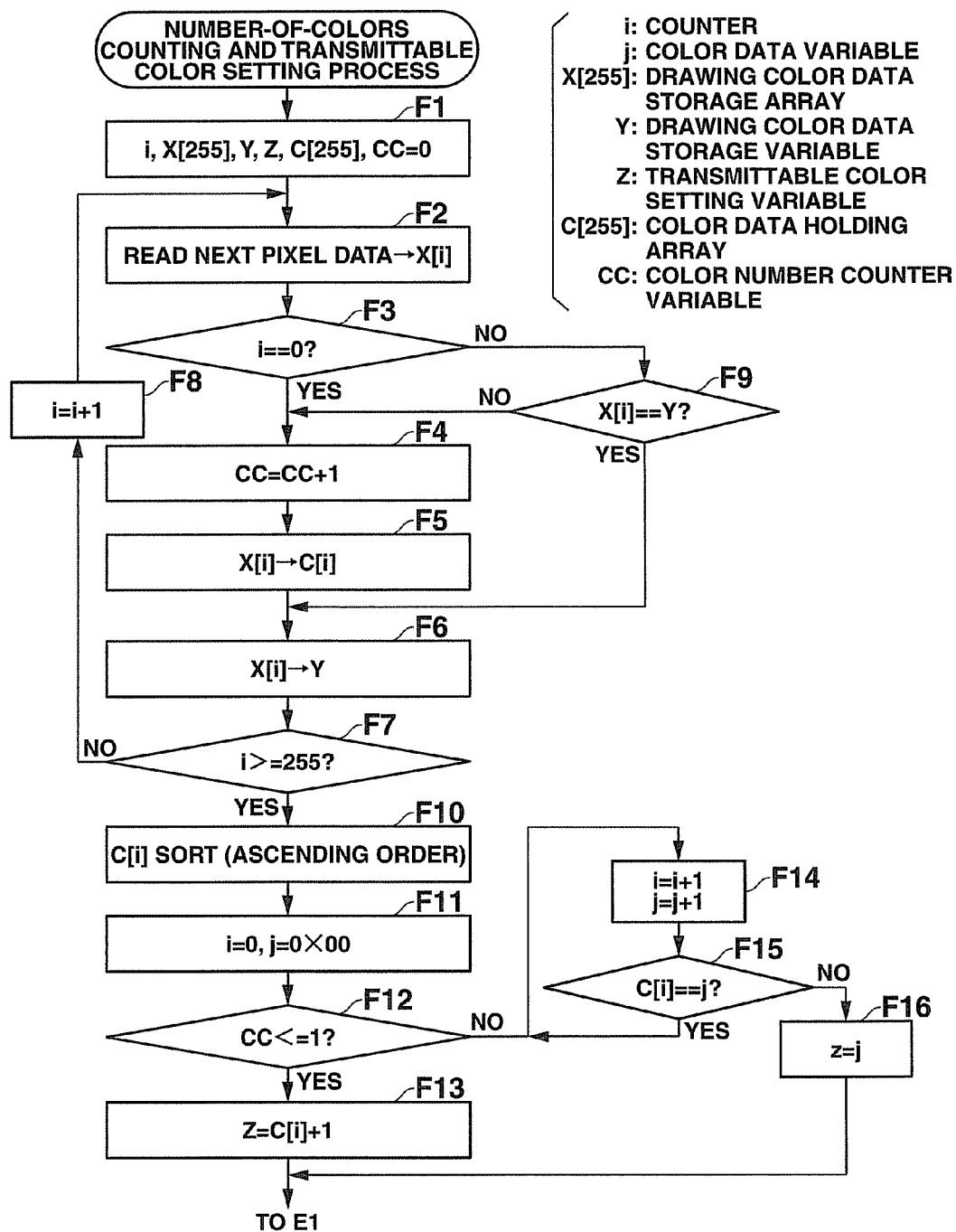
FIG. 17 is a flowchart to help explain a number-of-colors counting and transmittable color setting process for each divided tile accompanying the software difference process in the software process at the server apparatus 10.

Then, control is passed to a software difference process as shown in FIGS. 15 to 17 (step AE).

FIG. 15 is a flowchart to help explain a software difference process (part 1) for each divided tile when control is passed to a software process as a result of the transfer data thread process by client at the server apparatus 10.

FIG. 16 is a flowchart to help explain a software difference process (part 2) for each divided tile when control is passed to the software process as a result of the transfer data thread process by client at the server apparatus 10.

FIG. 17 is a flowchart to help explain a number-of-colors counting and transmittable color setting process for each divided tile accompanying a software difference process in the software process at the server apparatus 10.

First, when control has been passed to the software difference process (part 1) in FIG. 5, control is passed to the number-of-colors counting and transmittable color setting process in FIG. 17, thereby setting a transmittable color by the count of the color number for a first tile data item divided in the drawing area Q'.

When the number-of-colors counting and transmittable color setting process is started, counter i, a drawing color data storage array X [255], a drawing color data storage variable Y, a drawing color setting variable Z, a color data holding array C [255], and a color number counter variable CC are set in the RAM 105 (step F1). In the divided one-tile data (16×16 pixels), the first pixel data in position (x0, y0) on the one-tile data is read and stored as drawing color data X [i=0] (step F2).

At this time, since it is determined that counter value i=0 (step F3 (YES)), it is counted up to color number counter CC=1 (step F4) and drawing color data X on the first pixel [i=0] is held as color data C [i=0] (step F5).

Then, since drawing color data X [i=0] on the first pixel is stored as a drawing color data storage variable Y (step F6) and it is determined that counter i>=255, that is, all the pixel data items in one tile have not been processed (step F7 (N)), the counter value i is counted up to i=1 (step F8). Then, the next pixel data item in position (x1, y1) on one-title data is read and stored as drawing color data X [i=1] (step F2).

Then, since it has been determined that counter value i is not zero (counter value i≠0) (step F3 (NO)), it is determined whether drawing color data X [i=1] on the second pixel read this time is the same as drawing color data on the first pixel stored as drawing color data storage variable Y (step F9).

If it has been determined that drawing color data X [i=1] on the second pixel read this time is the same as drawing color data on the first pixel stored as drawing color data storage variable Y (X[1]==Y) (step F9 (YES)), drawing color data X [i=1] on the second pixel is stored as new drawing color data storage variable Y (step F6).

On the other hand, if it has been determined that drawing color data X [i=1] on the second pixel read this time is not the same as drawing color data on the first pixel stored as the drawing color data storage variable Y (step F9 (NO)), the color counter CC is counted up to CC=2 (step F4) and, at the same time, drawing color data X [i=1] on the second pixel is held as color data C [i=1] (step F5). Then, drawing color data X [i=1] on the second pixel is stored as drawing color data storage variable Y (step F6).

Specifically, when the processes in step F2 to step F9 are carried out repeatedly, the number of color data items used in each image pixel included in one-tile data (16×16 pixels) is recorded in the color number counter CC and the individual color data items are held as C[i . . . ]. Thereafter, if it has been determined that counter i has reached i=255, that is, all the pixel data items in one tile have been processed (step F7 (YES)), the individual color data items (color codes) C[i . . . ] included in the one-tile data are sorted in ascending order (step F10).

Then, counter i is reset to i=0 and color data variable j is reset to j=0x00 (step F11) and it is determined whether the color number counter CC<=1, that is, whether the number of color data items in the tile is equal to one or less (step F12).

Here, if it has been determined that color number counter $CC<=1$, that is, the number of color data items in the tile is one (step F12 (YES)), color data item (code) next to (+1) the color data item (code) $C[i]$ is set as transmittable color Z of the tile (step F13).

On the other hand, if it has been determined in step F12 that color number counter $CC<=1$ does not hold, that is, the number of color data items in the tile is two or more (step F12 (NO)), it is determined whether the counted-up color data item (code) j coincides with each of the color data items (codes) $C[i \ldots ]$ sorted in ascending order included in the tile ($C[i]==j$), while the counter i and the color data variable j are counted up sequentially (steps F14, F15).

Then, if it has been determined that the color data item (code) j sequentially counted up coincides with each of the color data items (codes) $C[i \ldots ]$ sorted in ascending order included in the tile ($C[i]==j$), a similar determining process is carried out repeatedly (step F15→F14, F15). Then, if it has been determined that the color data item (code) j counted up does not coincide with each of the color data items (codes) $C[i \ldots ]$ sorted in ascending order, the counted-up color data item (code) j which does not coincide with the color data items (codes) $C[i \ldots ]$ sorted in ascending order for the first time is set as transmittable color Z for the tile (step F16).

As described above, in one-tile data read from the drawing area Q' corresponding to a change in the image, color data the tile does not have is set as its transmittable color Z in the number-of-colors counting and transmittable color setting process of FIG. 17 (step EF). Then, the pixel coordinates (X0, Y0) of the starting point of the one-tile area and the pixel coordinates (X1, Y1) of its ending point are obtained (steps E1, E2).

Then, first, a counter Xt for moving the pixel specify position in the one-tile area horizontally is set to X0 (Xt=X0) and a counter Yt for moving the pixel specify position in the one-tile area vertically is set to Y0 (Yt=Y0) (step E3). Then, it is determined whether the vertical moving counter Vt is equal to or less than the ending point coordinate Y1 (Yt<=Y1) (step E4). At the same time, it is determined whether the horizontal moving counter Xt is equal to or less than the ending point coordinate X1 (Xt<=X1) (step E5).

If it has been determined that the vertical moving counter Vt is equal to or less than the ending point coordinate Y1 (Yt<=Y1) (step E4 (YES)) and that the horizontal moving counter Xt is equal to or less than the ending point coordinate X1 (Xt<=X1) (step E5 (YES)), pixel data pd0 on the present drawing one-tile data in the position indicated by the moving counter (Xt, Yt) is obtained (step E6) and pixel data pd1 on the preceding drawing one-tile data in the position indicated by the same moving counter (Xt, Yt) is obtained (step E7). Then, it is determined whether pixel data pd0 is the same as (or does not differ from) pixel data pd1 (pd0=pd1) (step E8).

If pixel data pd0 obtained from the present drawing one-tile data is the same as (or does not differ from) pixel data pd1 in the same position obtained from the preceding one-tile data (pd0=pd1) (step E8 (YES)), the transmittable color Z (→pd2) set in the transmittable color setting process (step EF) is written in the pixel position indicated by the moving counter (Xt, Yt) in the one-tile data transfer image area secured in the RAM 105 (step E9). On the other hand, if pixel data pd0 obtained from the present drawing one-tile data is not the same as (or differs from) pixel data pd1 in the same position obtained from the preceding one-tile data (step E8 (NO)), pixel data pd0 after the change is written in the pixel position indicated by the moving counter (Xt, Yt) in the one-tile data transfer image area (step E10).

Next, the horizontal moving counter Xt is counted up (Xt=Xt+1) (step E11), thereby returning control to the processes in step E4 and forward. Then, the process of acquiring present drawing pixel data pd0 in a position to which the pixel specify position is moved one pixel horizontally and the preceding pixel data pd1 (steps E6, E7) and the process of writing pixel data pd0 after the change or transmittable color data pd2 into a transfer image area according to the presence or absence of a change in the image (steps E8 to E10) are repeated.

Then, if it has been determined in step E11 that the horizontal moving counter Xt counted up has exceeded the ending point coordinate (Xt>X1) (step ES (NO)), the vertical moving counter Yt is counted up (Yt=Yt+1) (step E12) and the horizontal moving counter Xt is set again to the starting point coordinate X0 (Xt=X0) (step E13).

Next, control is returned to the processes in step E4 and forward. Then, the process of acquiring present drawing pixel data pd0 from the horizontal starting point position to which the pixel specify position has been moved one pixel vertically and the preceding pixel data pd1 (steps E6, E7) and the process of writing pixel data pd0 after the change or transmittable color data pd2 into a transfer image area according to the presence or absence of a change in the image (steps E8 to E10) are repeated.

Thereafter, while the horizontal moving counter Xt is counted up repeatedly and the count of the horizontal moving counter Xt is reset repeatedly as a result of the counting up of the vertical moving counter as described above, the process of acquiring present drawing pixel data pd0 in each pixel specify position on one-tile data and the preceding pixel data pd1 (steps E6, E7) and the process of writing pixel data pd0 after the change or transmittable color data pd2 into a transfer image area according to the presence or absence of a change in the image (steps E8 to E10) are repeated (steps E4 to E13).

Figure 18:
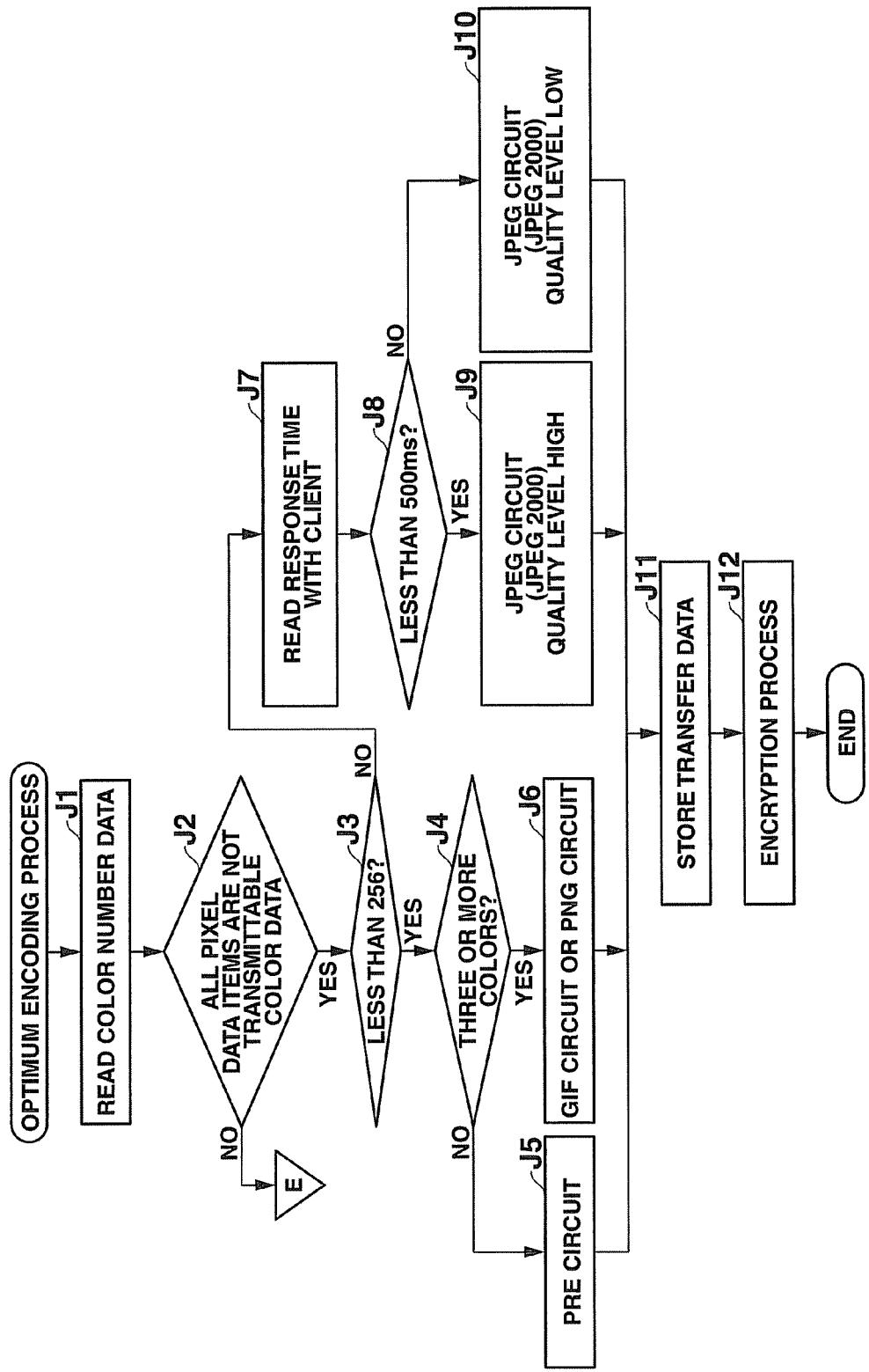
FIG. 18 is a flowchart to help explain a software optimum encoding process for each divided tile when control is passed to the software process as a result of the transfer data thread process by client at the server apparatus 10.

Then, if it has been determined in step E12 that the vertical moving counter Yt counted up has exceeded the ending point coordinate Y1 (Yt>Y1) (step E4 (NO)) and one-tile data transfer image area where changed pixel data is used as pixel data pd0 as it is and unchanged pixel data is converted into transmittable color data pd2 has been formed from the present drawing on-tile data, the software difference process of the tile is completed and control proceeds to a software optimum encoding process of FIG. 18 (step AJ).

FIG. 18 is a flowchart to help explain a software optimum encoding process for each divided tile when control is passed to a software process as a result of the transfer data thread process by client at the server apparatus 10.

When the optimum encoding process is started, color number data on the one-tile data transfer image area formed by using the changed pixel data as pixel data pd0 as it is and converting the unchanged pixel data into transmittable color data pd2 is read in the software difference process (step AE) in FIGS. 15 and 16 (step J1). Then, it is determined whether all the pixel data items in the one-tile data transfer image area are one-tile data with a change, not transmittable color data pd2, or whether all the pixel data items are one-tile data with no change or transmittable color data pd2 (step J2).

If it has been determined that all the pixel data items in the one-tile data transfer image area are one-tile data with a change, not transmittable color data pd2 (step J2 (YES)), it is determined whether the number of colors in the one-tile data is smaller than 256 colors (or equal to or larger than 256 colors) (step J3). If it has been determined that the number of colors is smaller than 256 colors (step J3 (YES)), it is further determined whether the number of colors is three colors or more (or 2 colors or less) (step J4).

If it has been determined in step J4 that the number of colors in the one-tile data is two colors or less (step J4 (NO)), a compression process is carried out by an RRE circuit whose compression method has a high compression ratio when the continuity of the same colors in adjacent pixels is high (step J11).

On the other hand, if it has been determined in steps J3 and J4 that the number of colors in the one-tile data is smaller than 256 colors and three colors or more (step J4 (YES)), a compression process is carried out by a GIF circuit or a PNG circuit whose compression method has a high compression ratio when the continuity of the same colors in adjacent pixels, giving priority to image quality, is high (step J6).

If it has been determined in step J3 that the number of colors in the one-tile data is as large as 256 colors or more (step J3 (NO)), a compression process is carried out by a JPEG circuit (JPEG 2000) with a low compression (high quality) in a communication state where a high-speed transfer with the response time with the client apparatus 20 being less than 500 ms is possible (step J9).

Furthermore, even if it has been determined in step J3 that the number of colors in the one-tile data is as large as 256 colors or more (step J3 (NO)), if a low-speed transfer is carried out with the response time with the client apparatus 20 being 500 ms more (steps J7, J8 (NO)), a compression process is carried out by a JPEG circuit (JPEG 2000) with a high compression (low quality) (step J10). The selection of the compression method is supposed to include the selection of compression ratios in the same compression method. For example, when the number of colors is large in the same JPEG compression, the compression ratio is made high. When the number of colors is small in the same JPEG compression, the compression ratio is made low. This makes it possible to keep the transfer data flowing through the network constant and use the network channels efficiently, which produces the effect of suppressing the deterioration of the display quality of the client apparatus.

After one-title data is compressed optimally in terms of both of compression ratio and picture quality by the compression circuit whose compression method is selected according to the number of colors in one-tile data and the communication time with the client apparatus 20, the one-tile data is not only stored as transfer data (step J11) but also encrypted (step J12).

Then, the optimally compressed and encrypted transfer one-tile data (see (B) in FIG. 12) is created as one-tile transfer data to whose header the coordinates on the present drawing data G', the transmittable color code, the compression method, and the forwarding client ID are added (step A18). The resulting one-tile transfer data is transferred to the client apparatus 20 with the ID shown in the header.

Here, if it has been determined that the tile-unit transfer of all the divided tile data items in the image-changed drawing area Q' in the present drawing data G' read in step A14 has not been completed (step A20 (NO))), the next divided one-tile data item in the drawing area Q' is read (step A21) and a one-tile data transfer image area is created and compressed and encrypted optimally in the software difference process and optimum encoding process in steps AE, AJ as described above.

On the other hand, in step J2 in the software optimum encoding process (step AJ), if it has been determined that all the pixel data items in the one-tile data transfer image area are transmittable color data pd2 and one-tile data with no change (step J2 (NO)), the one-tile data item is not transferred and the next divided one-tile data item in the drawing area Q' is read (step A21) and a one-tile data transfer image area is created and compressed and encrypted optimally in the software difference process and optimum encoding process in steps AE, AJ as described above.

Then, in the one-tile data transfer image area created by reading the next divided one-tile data in the drawing area Q' and calculating the difference between the one-tile data and the preceding drawing area Q, the process of creating transfer data obtained by compressing and encrypting the one-tile data when it has been determined that all the pixel data items are one-tile data with a change, not transmittable color data pd2 and the process of transmitting the transfer data to the client apparatus 20 (steps AE, AJ, A18 to A21) are carried out repeatedly. Alternatively, the process of not transferring the one-tile data when all the pixel data items are transmittable color data pd2 and one-tile data with no change (step AE, AJ→A21) is carried out repeatedly.

Thereafter, in the image-changed drawing area Q' in the present drawing data G' read in step A14, if it has been determined that the tile-unit transfer of all the divided tile data items has been completed (step A20 (YES)), control returns to step A2, where the update of the next drawing data resulting from the execution of the application is waited for to be determined.

Accordingly, with the server apparatus 10 configured as described above, the software process makes it possible to create transfer data obtained by writing transmittable color data Z(pd2) into the unchanged image pixels tile by tile in the image-changed drawing area Q' in the present drawing data G' and compressing the resulting data optimally. In addition to this, the transfer data obtained by converting all the image pixels in one tile into transmittable color data Z(pd2) is not transferred to the client apparatus 20. Only the transfer data with a change in the data is transferred to the client apparatus 20. Consequently, only the changed tile divided parts are extracted from the preceding drawing data G in the updated present drawing data G' and are compressed optimally, which minimizes the amount of transfer data while maintaining the image quality. This makes it possible to transmit the drawing data created and updated by the application to the client apparatus at a high speed with a high quality.

Figure 19:
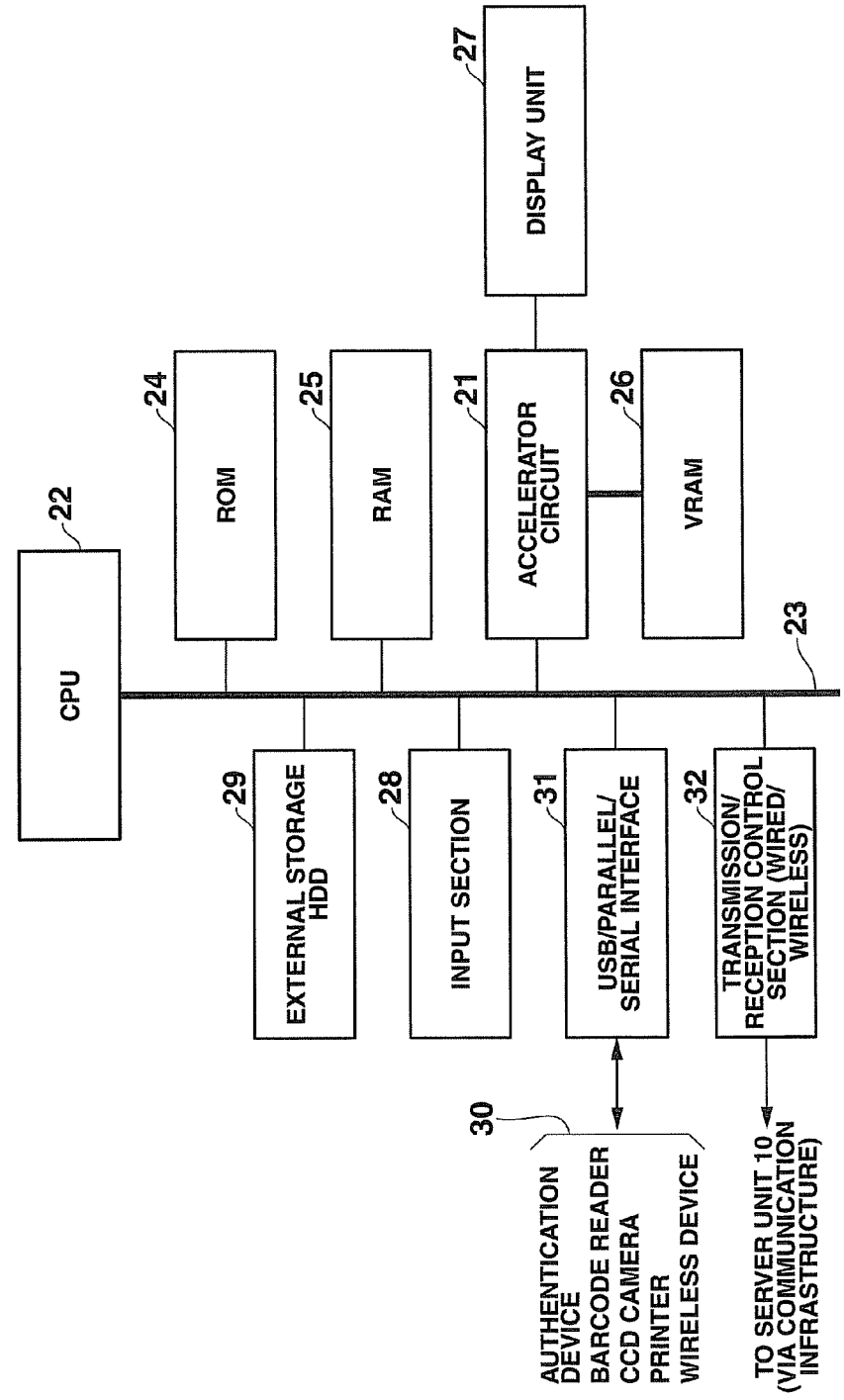
FIG. 19 is a block diagram showing a circuit configuration of the client apparatus 20 in the thin client system.

FIG. 19 is a block diagram showing a circuit configuration of the client apparatus 20 in the thin client system.

The client apparatus 20 includes a CPU 22 serving as a computer. Not only a ROM 24 and a RAM 25 but also the accelerator circuit 21 is connected via a bus 23 to the CPU 22. The accelerator circuit 21 is provided with a VRAM 26. Drawing data written in the VRAM 26 is output to a display unit 27, which displays the drawing data.

Further connected via the bus 23 to the CPU 22 are an input section 28, such as a keyboard, an external storage HDD (Hard Disk Drive) 29, a USB/parallel/serial interface 31 for connecting various external units 30, including an authentication device, a bar-code reader, a CCD camera, a printer, and a wireless device, a transmission/reception control section (wired/wireless) 32 for transmitting and receiving data to and from the server apparatus 10.

The CPU 22 controls the operation of various parts of the circuitry using the RAM 25 as a working memory according to a system program previously stored in the ROM 24. In the CPU 22, the system program is started and executed according to the key input signal from the input section 28 or the application response signal and transfer drawing data received via the transmission/reception control section 32 from the server apparatus 10.

In the client apparatus 20, various data items created by executing the application program in the server apparatus 10 are read and stored into the external storage HDD 29. The created and transferred display drawing data is decoded at the accelerator circuit 21. The decoded data is written into the VRAM 26 and displayed on the display unit 27.

Figure 20:
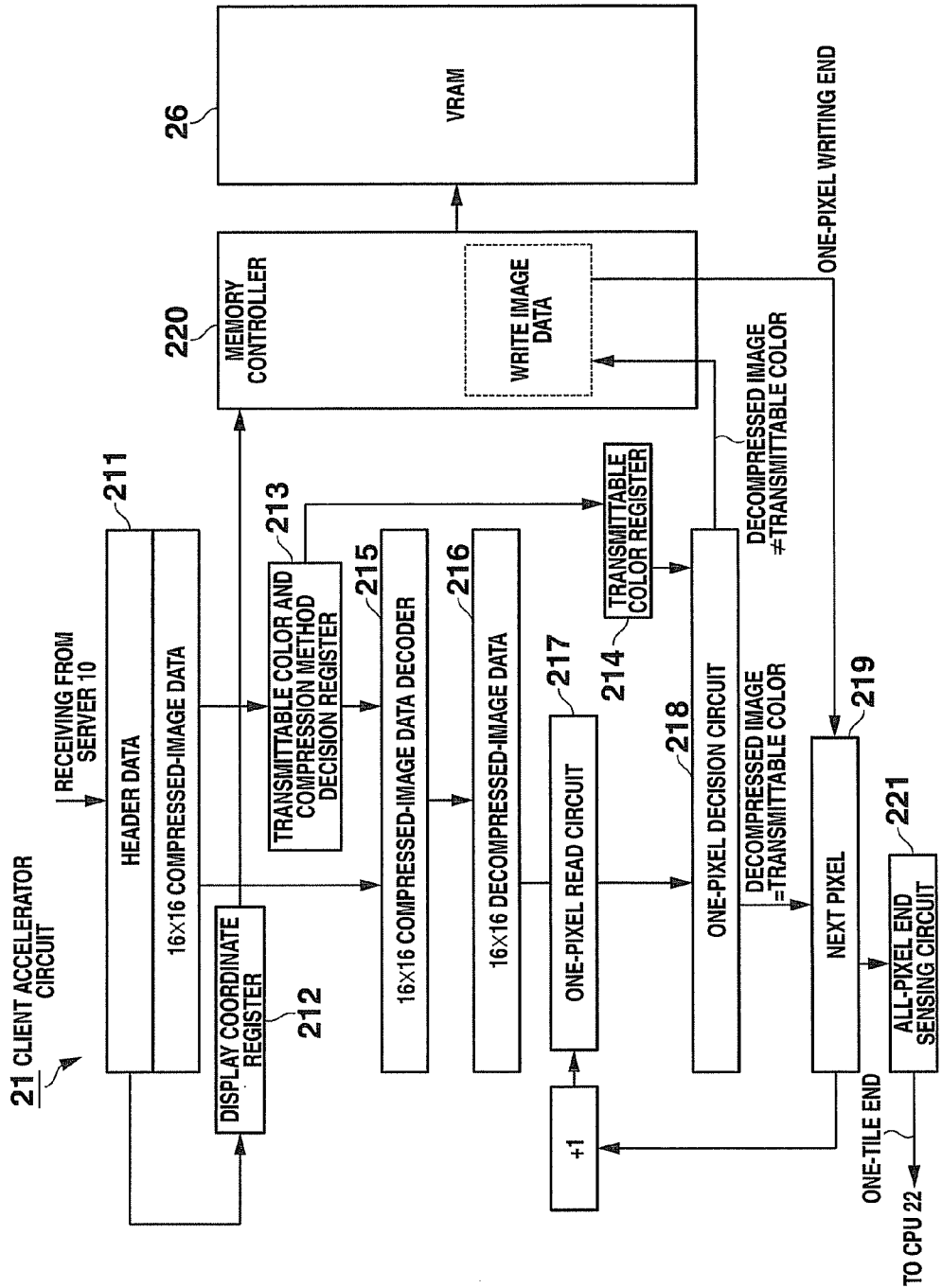
FIG. 20 is a block diagram showing a circuit configuration of an accelerator circuit 21 in the client apparatus 20 of the thin client system.

FIG. 20 is a block diagram showing a circuit configuration of the accelerator circuit 21 in the client apparatus 20 of the thin client system.

A one-tile of transfer drawing data (see (B) in FIG. 12) corresponding to the drawing area Q' in the present drawing data G' created, compressed optimally, and encrypted by the hardware process carried out by the accelerator circuit 101 of the server apparatus 10 or by the software process and transferred sequentially in units of one-tile data is stored in a header data/16×16 compressed-image data register 211.

Then, the coordinates of the display position of the one-tile data read from the header data of the tile of transfer drawing data stored in the header data/16×16 compressed-image data register 211 are set in a display coordinate register 212. The transmittable color data S (Z) in the one-tile data and the compression method are set in a transmittable color and compression method decision register 213. The transmittable color data S(Z) is also set in a transmittable color register 214.

The tile of transfer drawing data stored in the header data/16×16 compressed-image data register 211 is decoded at a 16×16 compressed-image data decoder 215 according to the compression method for the one-tile data set in the transmittable color and compression method decision register 213. The resulting data is stored in a 16×16 decompressed-image data register 216.

The decompressed one-tile drawing data stored in the 16×16 decompressed-image data register 216 is read pixel data item by pixel data item by a one-pixel read circuit 217. A one-pixel decision circuit 218 determines whether the one-pixel data item is transmittable color data S(Z) for the one-tile data item set in the transmittable color register 214.

If the one-pixel decision circuit 218 has determined that the one-pixel data item read this time by the one-pixel read circuit 217 is the transmittable color data S(Z) for the one-tile data item, the one-pixel read circuit 217 updates the pixel read position according to a command signal from a next pixel command circuit 219 and reads the next one-pixel data item.

If the one-pixel decision circuit 218 has determined that the one-pixel data item read this time by the one-pixel read circuit 217 is not the transmittable color data S(Z) for the one-tile data item but pixel data for image changes, a memory controller 220 writes image data on the pixel read this time into the VRAM 26 according to the coordinates representing the display position of the one-tile data set in the display coordinate register 212.

At this time, when the memory controller 220 outputs a one-pixel write end signal, the one-pixel read circuit 217 updates the pixel read position according to the command signal output from the next pixel command circuit 219, thereby reading the next one-pixel data item.

Then, when an all pixel end sensing circuit 221 have counted the command signal from the next pixel command circuit 219 for 256 pixels, a one-tile end signal is output to the CPU 22, going into a standby state where the reception of the next tile of transfer drawing data (see (B) in FIG. 12) from the server apparatus 10 is waited for.

Figure 21:
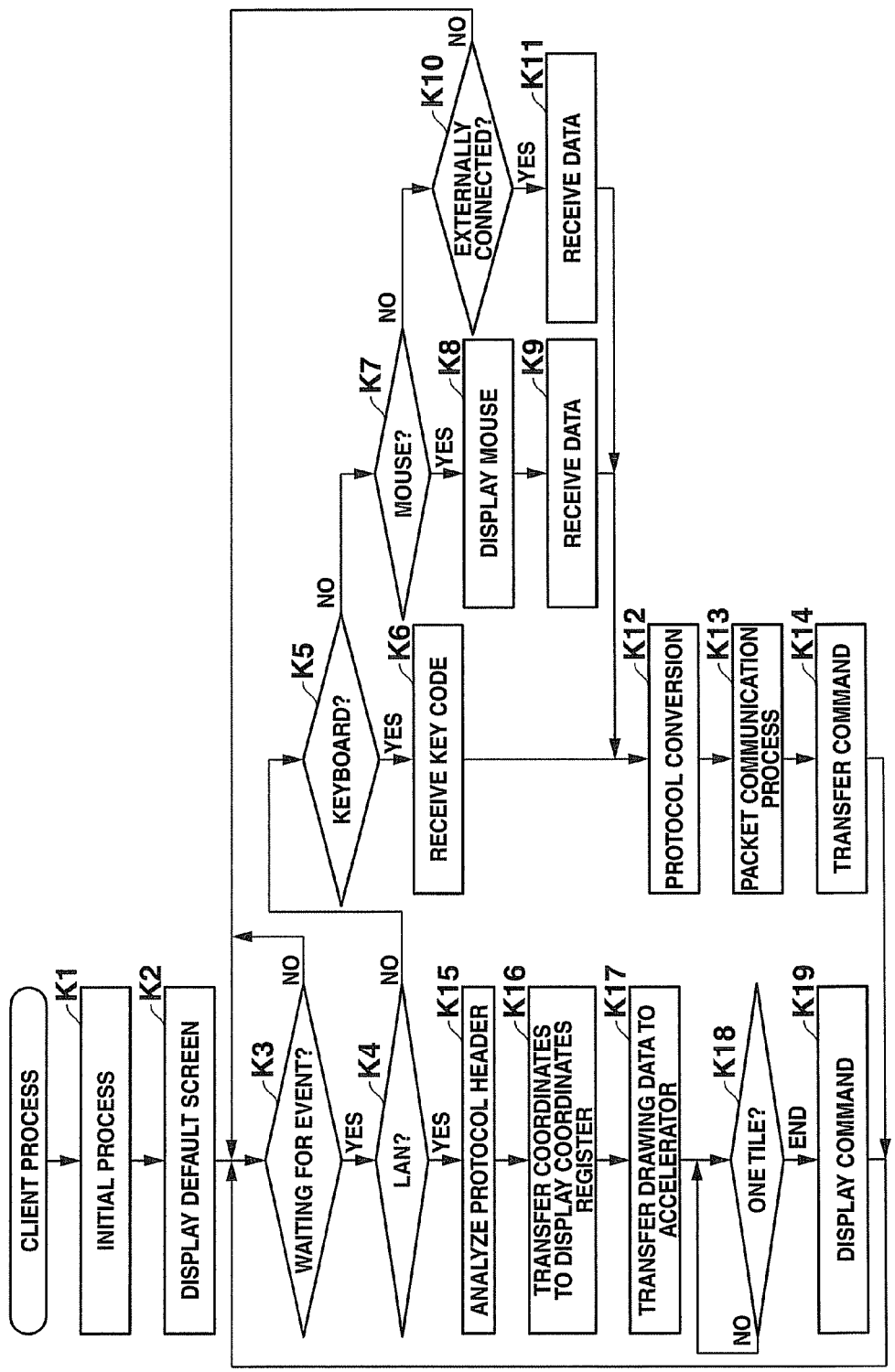
FIG. 21 is a flowchart to help explain an overall operation control in the client apparatus 20 of the thin client system.

FIG. 21 is a flowchart to help explain an overall operation control in the client apparatus 20 of the thin client system.

When the power supply is turned on, an initial screen set by default together with various initial setting processes (step K1) is displayed on the display unit 27 (step K2), going into an event waiting state (step K3).

Then, when the CPU 22 has received the key code as a result of the operation of the keyboard on the input section 28 (step K5→step K6), the received key code is protocol-converted (step K12) and subjected to a packet communication process (step K13). The resulting signal is transmitted to the server apparatus 10 according to a transfer command (step K14).

Then, when the mouse cursor has been moved on the display screen as a result of the operation of the mouse at the input section 28 (step K7→step K8) and the data extracted according to the operation of the mouse is received by the CPU 22 (step K9), the received extracted data is protocol-converted (step K12) and subjected to a packet communication process (step K13). The resulting data is transmitted to the server apparatus 10 according to a transfer command (step K14).

Moreover, when data from various external units connected via the USB/parallel/serial interface 31 are received by the CPU 22 (step K10→step K11), the received data is protocol-converted (step K12) and subjected to a packet communication process (step K13). The resulting data is transmitted to the server apparatus 10 according to a transfer command (step K14).

Furthermore, when one tile of transfer drawing data transmitted from the server apparatus 10 is received via the network N (LAN) (step K4), the TCP-IP protocol header is analyzed and extracted (step K15), the coordinates indicating the display position of the one-tile data are transferred and set in a display coordinate register 212 (step K16), and the one tile of drawing data is transferred to the accelerator circuit 21 (see FIG. 20) (step K17).

Then, when the accelerator circuit 21 has output a one-tile end signal (step K18), a display command is output (step K19), causing the display screen data to be updated on the basis of the one-tile of transfer drawing data written in the VRAM 26 of the accelerator circuit 21.

Accordingly, with the client apparatus 20 configured as described above, it is determined whether the drawing data optimally compressed, encrypted, and transferred tile data item by tile data item from the server apparatus 10 is transmittable color data S(Z) set in the one-tile data decoded one-pixel data item by one-pixel data item by the accelerator circuit 21. The display of pixel data with no image change, transmittable color data (S), is not updated. Only the display of pixel data with an image change, not transmittable color data S(Z), is updated. Consequently, it is possible to display and update the drawing data transferred and received from the server apparatus 10 at high speed without imposing a heavy burden on the CPU 22 even at the client apparatus 20.

The methods in the various processes carried by the server apparatus 10 described in the embodiment, including the entire operation control process shown in the flowchart of FIG. 11, the transfer data thread process by client shown in the flowchart of FIG. 12, the accelerator circuit activating process shown in the flowchart of FIG. 13, the response time sensing process accompanying the accelerator circuit activating process shown in FIG. 14, the software difference process for each divided tile when control is passed to the software process as a result of the transfer data thread process by client shown in the flowcharts in FIGS. 15 and 16, the number-of-colors counting and transmittable color setting process accompanying the software difference process shown in the flowchart of FIG. 17, and the software optimum encoding process for each divided tile when control is passed to the software process as a result of the transfer data thread process by client shown in the flowchart of FIG. 18, can be stored as a computer-executable program into an external recording medium, such as a memory card (e.g., a ROM card or a RAM card), a magnetic disk (e.g., a floppy disk or a hard disk), an optical disk (e.g., a CD-ROM or a DVD), or a semiconductor memory, and be distributed. The computer (CPU 102) of the server apparatus 10 reads the program stored in the external recording medium into a storage unit (110) and controls the operation according to the read-in program, thereby realizing the process of creating transfer drawing data (difference-compressed drawing data h) when the drawing is updated, the optimum compression process, and the process of transferring the resulting data to the client apparatus 20 explained in the embodiment, which enables similar processes to be carried out by the above-described methods.

Furthermore, data on the programs to realize the various methods can be transferred over a communication network (LAN) N in the form of program codes. The program data may be taken in via the transmission/reception control section 111 from the computer unit (program server) connected to the communication network (LAN) N and stored in the storage unit 110, which makes it possible to realize the process of creating transfer drawing data (difference-compressed drawing data h) when the drawing is updated, the process of compressing the data optimally, and the process of transferring the resulting data to the client apparatus 20.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image transfer system, comprising a server apparatus, which causes drawing data created at the server apparatus to be transmitted to a client apparatus and displayed on a display screen of the client apparatus, the server apparatus comprising:
   a drawing data storage unit which stores preceding drawing data on a preceding screen transferred to the client apparatus and present drawing data on a created present screen;
   an area dividing unit which divides drawing data into a plurality of drawing areas;
   a specific data converting unit which compares the present drawing data with the preceding drawing data for each of the drawing areas, and converts pixels of drawing data of a portion having no change into specific data in each of the plurality of drawing areas in the present drawing data, wherein the specific data comprises data that identifies the converted pixels as being associated with no change with reference to the preceding drawing data;
   a specific drawing area detecting unit which detects a specific drawing area having both the specific data converted by the specific data converting unit and the drawing data of a portion which has a change in the present drawing data from the preceding drawing data;
   a compressing unit which compresses drawing data corresponding to the specific drawing area; and
   a transmission control unit which transmits, to the client apparatus, the compressed drawing data;
   wherein the specific data requires no rewriting when the client apparatus displays the compressed drawing data.

2. The image transfer system according to claim 1, the server apparatus further comprising a drawing area detecting unit which detects a drawing area in which the present drawing data is converted by the specific data converting unit, wherein the compressing unit determines and compresses drawing areas undetected by the specific drawing area detecting unit as the specific drawing area.

3. The image transfer system according to claim 1 or 2, wherein the compressing unit includes a number-of-colors counting unit which counts a number of colors in the drawing data of the drawing area to be compressed, and a compression method detection unit which determines a compression method according to the number of colors counted by the number-of-colors counting unit.

4. The image transfer system according to claim 1 or 2, wherein the compressing unit includes a communication load sensing unit which detects a load on the client apparatus in a communicating state, and a compression method decision unit which determines a compression method according to the load on the client apparatus in the communicating state detected by the communication load sensing unit, and
   compresses the drawing data in the drawing area to be compressed according to the compression method determined by the compression method decision unit; and
   the transmission control unit adds information indicating the method of compressing the drawing data to the drawing data of the drawing area having a change from the preceding drawing data compressed by the compressing unit, and transmits resulting data to the client apparatus.

5. The image transfer system according to claim 1 or 2, wherein the compressing unit includes a number-of-colors counting unit which counts a number of colors in the drawing data of the drawing area to be compressed, and a communication load sensing unit which detects a load on the client apparatus in a communicating state, and a compression method decision unit which determines a compression method according to the number of colors counted by the number-of-colors counting unit and the load on the client apparatus in the communicating state detected by the communication sensing unit, and
   compresses the drawing data in the drawing area to be compressed according to the compression method determined by the compression method decision unit, and
   the transmission control unit adds information indicating the method of compressing the drawing data to the drawing data in the drawing area having a change from the preceding drawing data compressed by the compressing unit, and transmits resulting data to the client apparatus.

6. The image transfer system according to claim 1, the server apparatus further comprising a transmittable color setting unit which detects color data of each pixel constituting the drawing area for each drawing area in the present drawing data divided by the area dividing unit and sets color data other than the detected color data as a transmittable color for the drawing area,
   wherein the specific data replaces the pixel data in the drawing area in the present drawing data determined to have no change by the specific data converting unit and is transmittable color data for the drawing area set by the transmittable color setting unit.

7. The image transfer system according to claim 1, wherein the transmission control unit adds information indicating a method of compressing the drawing data and coordinate information on the present drawing data in the drawing area to the drawing data of the present drawing data compressed by the compressing unit, and transmits resulting data to the client apparatus.

8. A non-transitory recording medium having computer-executable instructions stored thereon that, in response to execution, cause an image transfer system, comprising a server apparatus, to perform processes to facilitate drawing data created at the server apparatus to be transmitted to a client apparatus and displayed on a display screen of the client apparatus, the instructions causing the server apparatus to carry out the following processes:

a drawing data storage control which stores preceding drawing data on the preceding screen transferred to the client apparatus into a memory and present drawing data on a created present screen;

an area dividing control which divides the drawing data stored in the memory into a plurality of drawing areas;

a specific data converting unit which compares the present drawing data with the preceding drawing data for each of the drawing areas, and replaces drawing data of a portion having no change with specific data in each of the plurality of drawing areas in the present drawing data, wherein the specific data comprises data that identifies the drawing data of the portion having no change with reference to the preceding drawing data;

a specific drawing area detecting control which detects a specific drawing area having both the specific data and the drawing data of a portion which has a change in the present drawing data from the preceding drawing data and the specific data as a specific drawing area;

a compressing control which compresses the drawing data corresponding to the specific drawing area; and a transmission control which transmits, to the client apparatus, compressed drawing data;

wherein the specific data requires no rewriting when the client apparatus displays the compressed drawing data.

9. The non-transitory recording medium according to claim 8, the instructions causing the server apparatus to carry out the following processes:

counting a number of colors in the drawing data on a drawing area to be compressed; and determining a compression method according to the number of colors counted;

wherein the compressing control compresses the drawing data in the drawing area to be compressed by a compression circuit of the determined compression method, and the transmission control adds information indicating the determined compression of compressing the drawing data to the drawing area in the drawing area having a change from the preceding drawing data compressed by the compressing control, and transmits resulting data to the client apparatus.

10. The non-transitory recording medium according to claim 8, the instructions causing the server apparatus to carry out the following processes:

communication load detection which detects a load on the client apparatus in a communicating state, compression method decision which determines a compression method according to the load on the client apparatus in the communicating state detected by the communication load detection, and drawing data compression which compresses the drawing data in the drawing area to be compressed by the compression circuit of the determined compression method, in the compression control; and the transmission control adds information indicating a method of compressing the drawing data to the drawing data of the drawing area having a change from the preceding drawing data compressed by the compressing control in the computer of the server apparatus, and transmits resulting data to the client apparatus.

11. The non-transitory recording medium according to claim 8, the instructions causing the server apparatus to carry out the following processes:

counting a number of colors in the drawing data on a drawing area to be compressed;

detecting a load on the client apparatus in a communicating state; and determining a compression method according to the number of colors counted and the detected load on the client apparatus in the communicating state;

wherein the compressing control compresses the drawing data in the drawing area to be compressed by a compression circuit of the determined compression method, and the transmission control adds information indicating the method of compressing the drawing data to the drawing data in the drawing area having a change from the preceding drawing data compressed by the compressing control, and transmits resulting data to the client apparatus.

12. A client apparatus for a computer system which causes drawing data created at a server apparatus to be received and displayed on its display screen, the client apparatus comprising:

a compression/decompression unit which decompresses the compressed drawing data in a drawing data of the present drawing data received from the server apparatus;

a pixel data decision unit which reads, pixel data item by pixel data item, the drawing data in the drawing area decompressed by the compressing/decompressing unit and determines whether the pixel data is specific data, the specific data comprising data indicating that there is no change in the drawing data; and a display update control unit which updates the display on the display screen according to pixel data other than the pixel data determined to be specific data by the pixel data decision unit;

wherein the pixel data determined to be the specific data requires no updating when the display update control unit updates the displays on the display screen.

* * * * *